(12) United States Patent
Grube et al.

(10) Patent No.: US 9,015,499 B2
(45) Date of Patent: Apr. 21, 2015

(54) VERIFYING DATA INTEGRITY UTILIZING DISPERSED STORAGE

(71) Applicant: Cleversafe, Inc., Chicago, IL (US)

(72) Inventors: Gary W. Grube, Barrington Hills, IL (US); Timothy W. Markison, Mesa, AZ (US); Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 13/959,688

(22) Filed: Aug. 5, 2013

(65) Prior Publication Data

US 2013/0325820 A1  Dec. 5, 2013

Related U.S. Application Data

(63) Continuation-in-part of application No. 13/270,654, filed on Oct. 11, 2011.

(60) Provisional application No. 61/408,980, filed on Nov. 1, 2010.

(51) Int. Cl.
*H04L 29/06* (2006.01)
*G06F 17/30* (2006.01)
*G06F 11/07* (2006.01)

(52) U.S. Cl.
CPC ...... *G06F 17/30371* (2013.01); *G06F 11/0727* (2013.01); *G06F 11/076* (2013.01); *G06F 2211/1028* (2013.01)

(58) Field of Classification Search
CPC ........................ G06F 11/0727; G06F 11/30371
USPC .......................................... 719/193
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

(Continued)

*Primary Examiner* — Harunur Rashid
*Assistant Examiner* — Dao Ho
(74) *Attorney, Agent, or Firm* — Garlick & Markison; Timothy W. Markison

(57) ABSTRACT

A method begins by a processing module retrieving at least a threshold number of error coded data slices of a set of error coded data slices from storage units of a dispersed storage network (DSN) and identifying, based on an intentional error pattern, error coded data slices that were intentionally altered to produce identified error coded data slices. The method continues with the processing module decoding the set of error coded data slices to produce a recovered data segment and encoding the recovered data segment using an altered dispersed storage error encoding function to produce a test set of error coded data slices for comparing with corresponding error coded data slices. When the test set of error coded data slices substantially match the corresponding error coded data slices, the method continues with the processing module indicating that the recovered data segment has not been corrupted.

16 Claims, 27 Drawing Sheets

(56) References Cited

U.S. PATENT DOCUMENTS

| | | | |
|---|---|---|---|
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

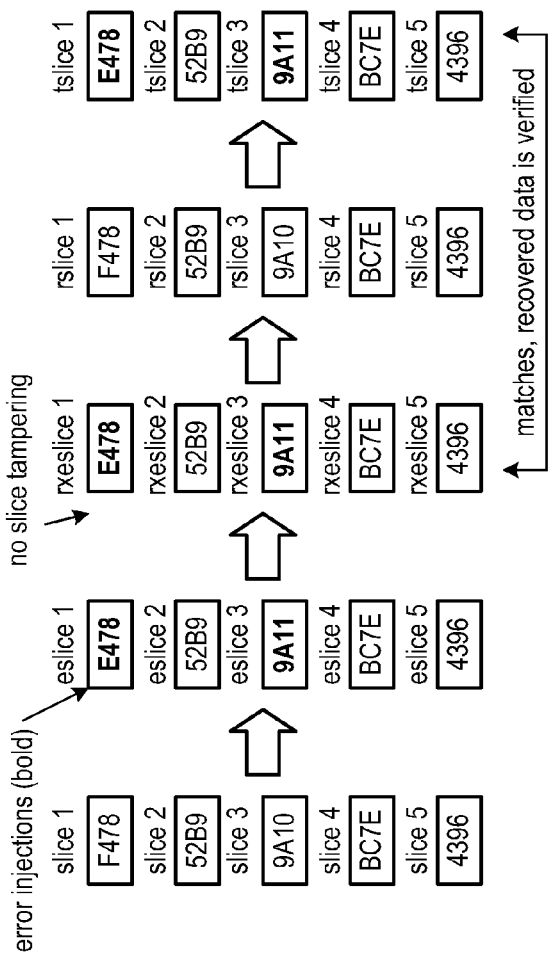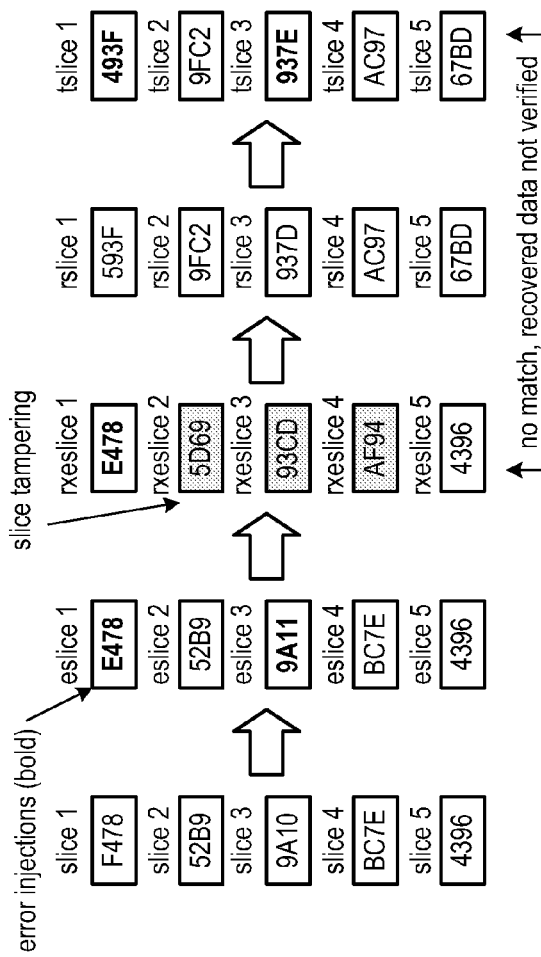

FIG. 9G

$$(E) \begin{bmatrix} a & b & c \\ d & e & f \\ g & h & i \\ j & k & l \\ m & n & o \end{bmatrix} * (D) \begin{bmatrix} D1 & D2 & D3 & D4 \\ D5 & D6 & D7 & D8 \\ D9 & D10 & D11 & D12 \end{bmatrix} = (C) \begin{bmatrix} X11 & X12 & X13 & X14 \\ \mathbf{X21} & \mathbf{X22} & \mathbf{X23} & \mathbf{X24} \\ X31 & X32 & X33 & X34 \\ X41 & X42 & X43 & X44 \\ X51 & X52 & X53 & X54 \end{bmatrix} \Rightarrow \text{slice 1..5}$$

error injections (bold) → (C)

FIG. 9H

$$(E) \begin{bmatrix} a & b & c \\ d & e & f \\ g & h & i \\ j & k & l \\ m & n & o \end{bmatrix} * (D) \begin{bmatrix} D1 & D2 & D3 & D4 \\ D5 & D6 & D7 & D8 \\ D9 & D10 & D11 & D12 \\ \mathbf{E1} & \mathbf{E2} & \mathbf{E3} \end{bmatrix} = (C) \begin{bmatrix} X11 & X12 & X13 & X14 & \mathbf{X15} \\ X21 & X22 & X23 & X24 & \mathbf{X25} \\ X31 & X32 & X33 & X34 & \mathbf{X35} \\ X41 & X42 & X43 & X44 & \mathbf{X45} \\ X51 & X52 & X53 & X54 & \mathbf{X55} \end{bmatrix} \Rightarrow \text{slice 1..5}$$

error injections (bold); resulting error coded blocks (bold)

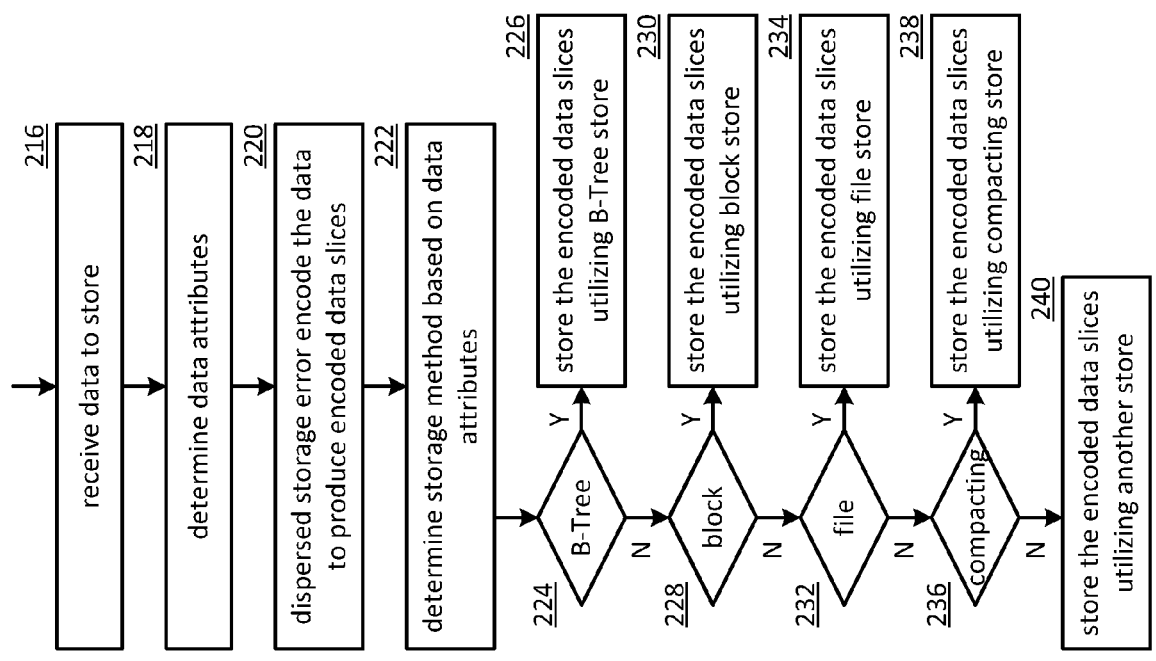

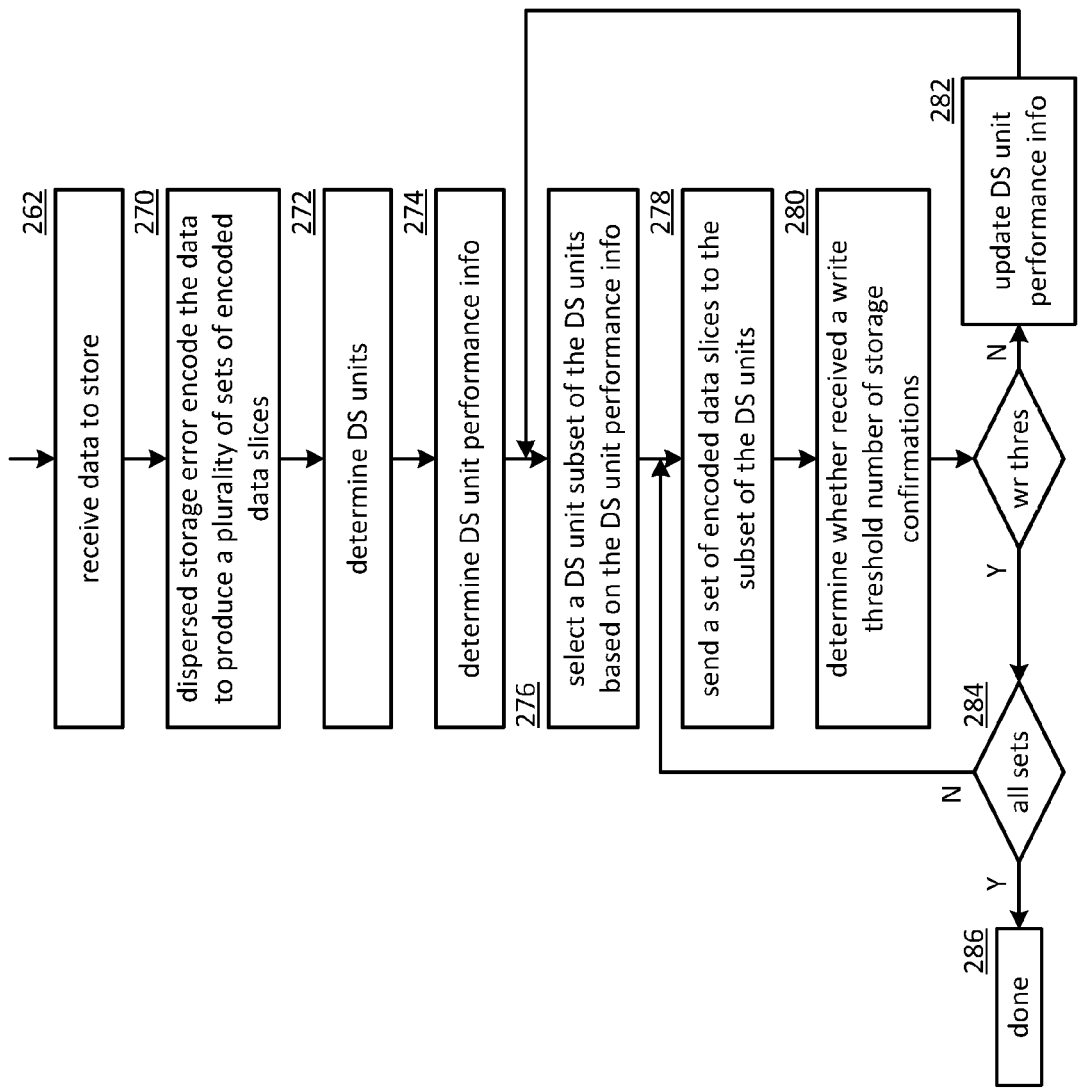

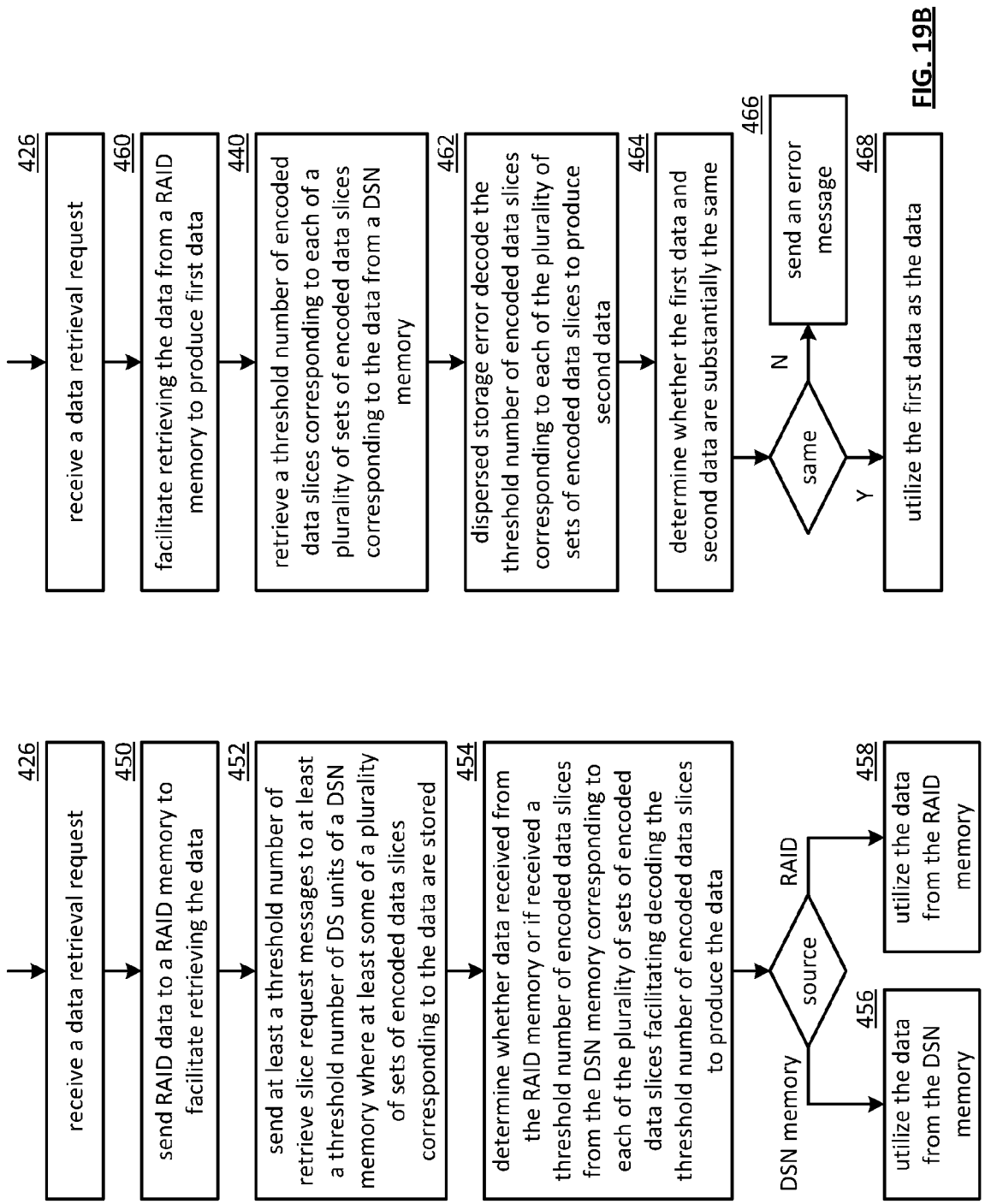

VERIFYING DATA INTEGRITY UTILIZING DISPERSED STORAGE

CROSS REFERENCE TO RELATED PATENTS

The present U.S. Utility patent application claims priority pursuant to 35 U.S.C. §120, as a continuation-in-part (CIP), to the following U.S. Utility patent application, which is hereby incorporated herein by reference in its entirety and made part of the present U.S. Utility patent application for all purposes:

U.S. Utility application Ser. No. 13/270,654, entitled "STORING DATA INTEGRITY INFORMATION UTILIZING DISPERSED STORAGE, filed Oct. 11, 2011, which claims priority pursuant to 35 U.S.C. §119 (e) to the following U.S. Provisional patent application which is hereby incorporated herein by reference in its entirety and made part of the present U.S. Utility patent application for all purposes:

U.S. Provisional Application Ser. No. 61/408,980, entitled "DISPERSED STORAGE NETWORK COMMUNICATION," filed Nov. 1, 2010.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to generate integrity information based on data being stored and to store the integrity information along with the data enabling subsequent validation of retrieved data based on a comparison of retrieved integrity information to calculated integrity information of retrieved data. While comparing retrieved integrity information to calculated integrity information of retrieved data can identify data corruption, stored integrity information can be vulnerable to attack.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

Figure 9A:
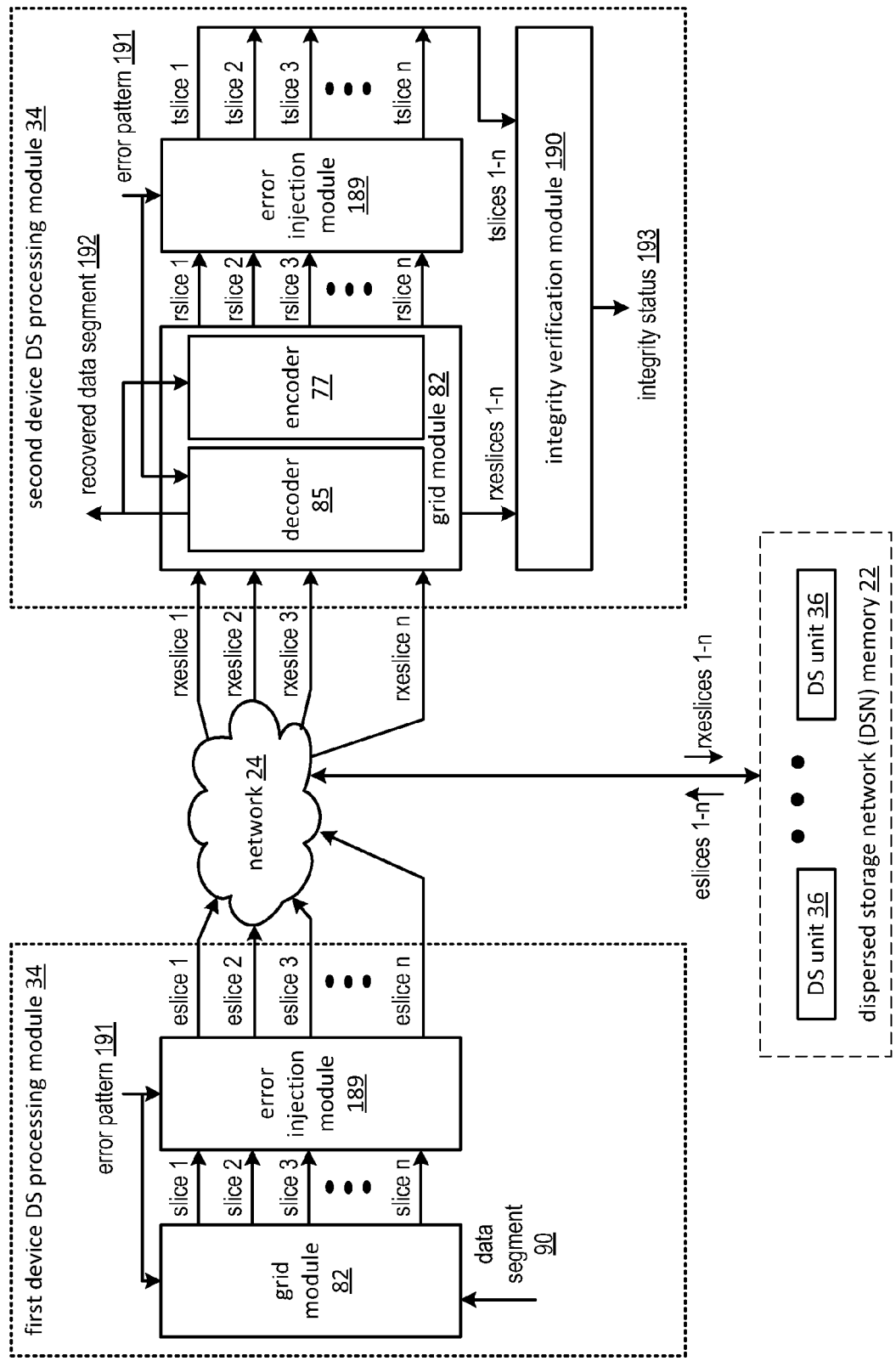
FIG. 9A is a schematic block diagram of an embodiment of a dispersed storage network (DSN) in accordance with the present invention.
Figure 9D:
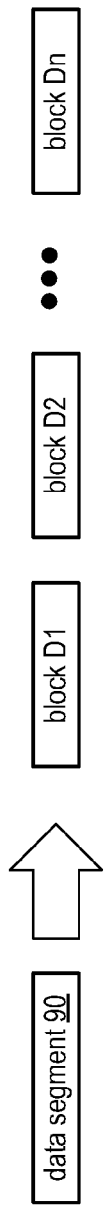
Figure 9E:
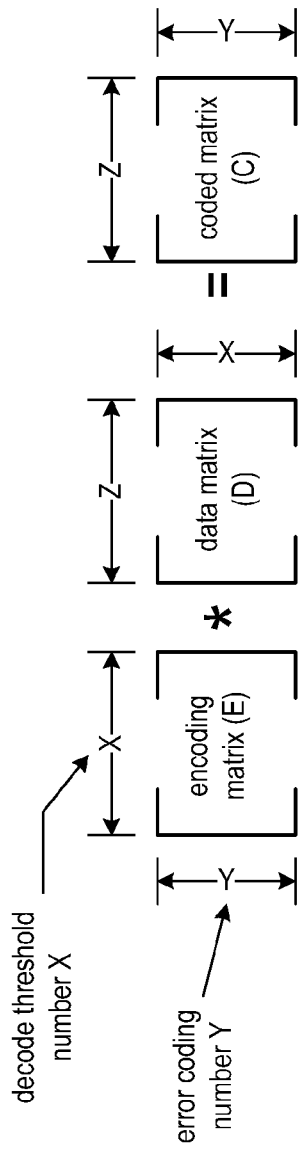
Figure 9F:
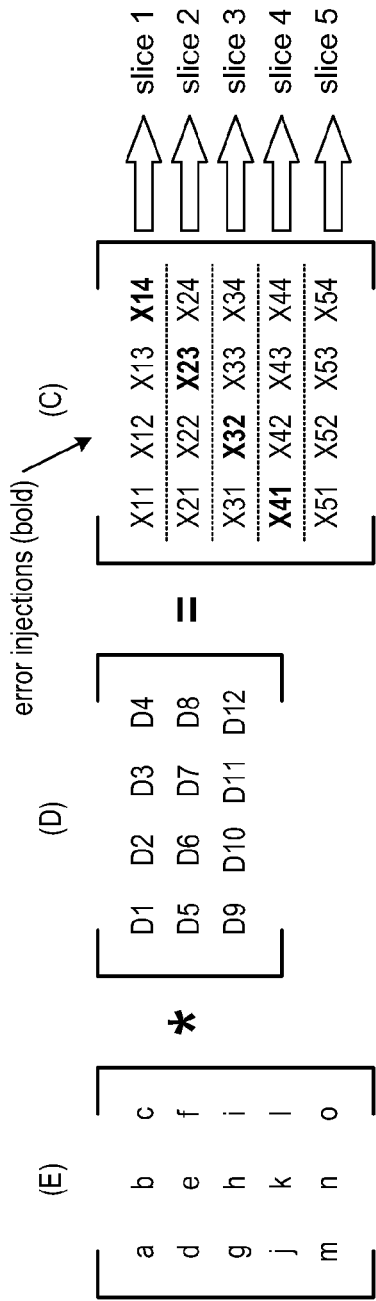
Figure 9I:
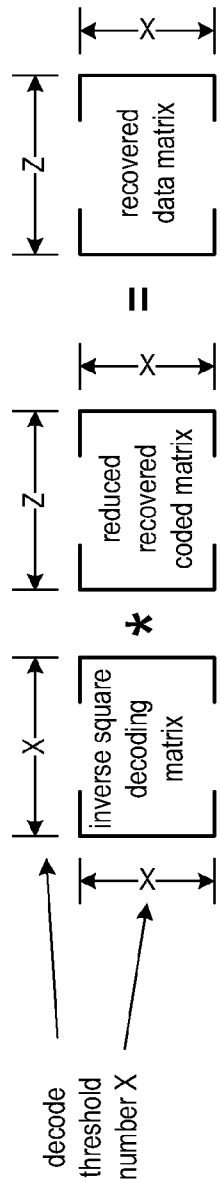
Figure 9J:
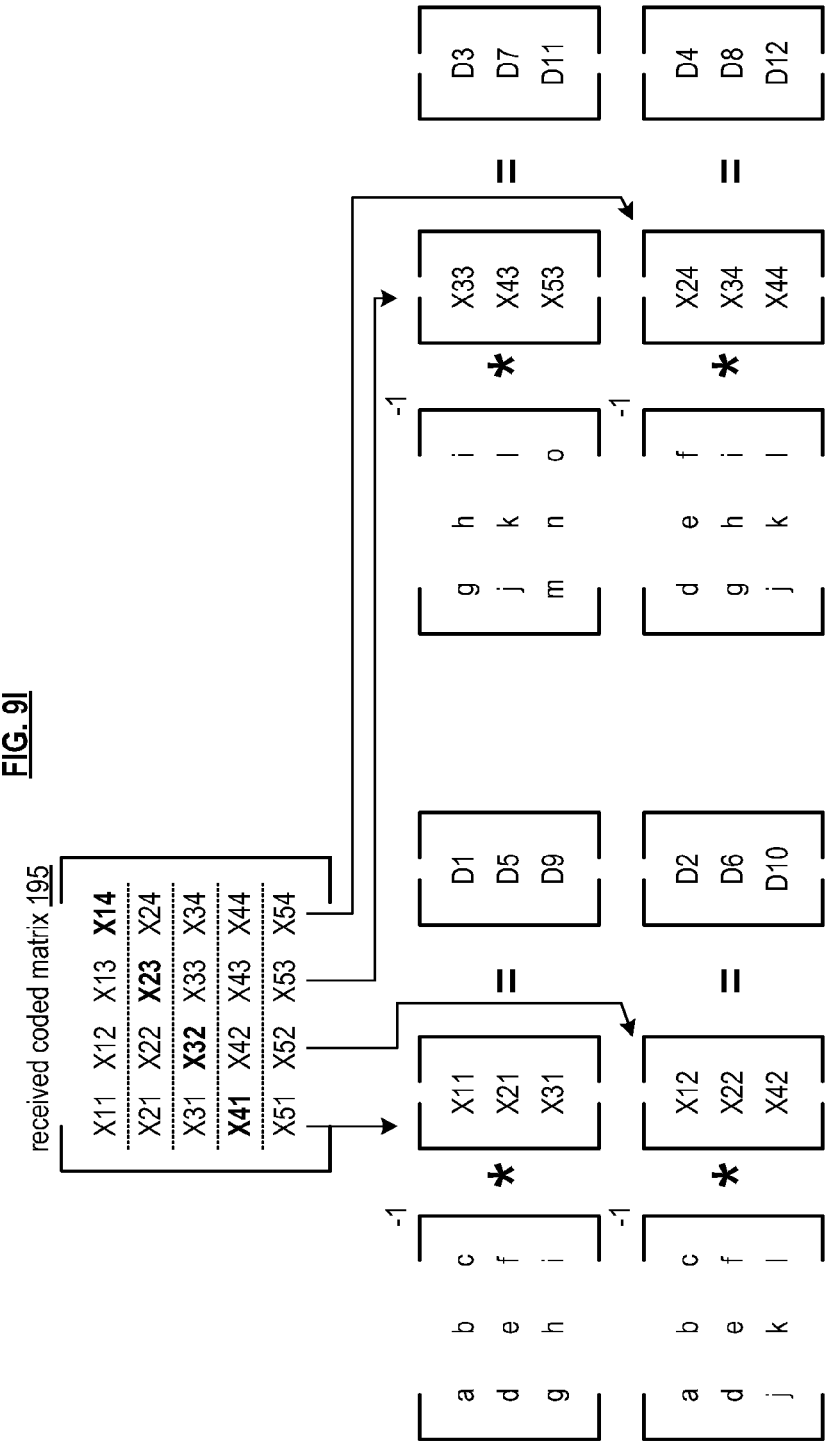
Figure 9K:
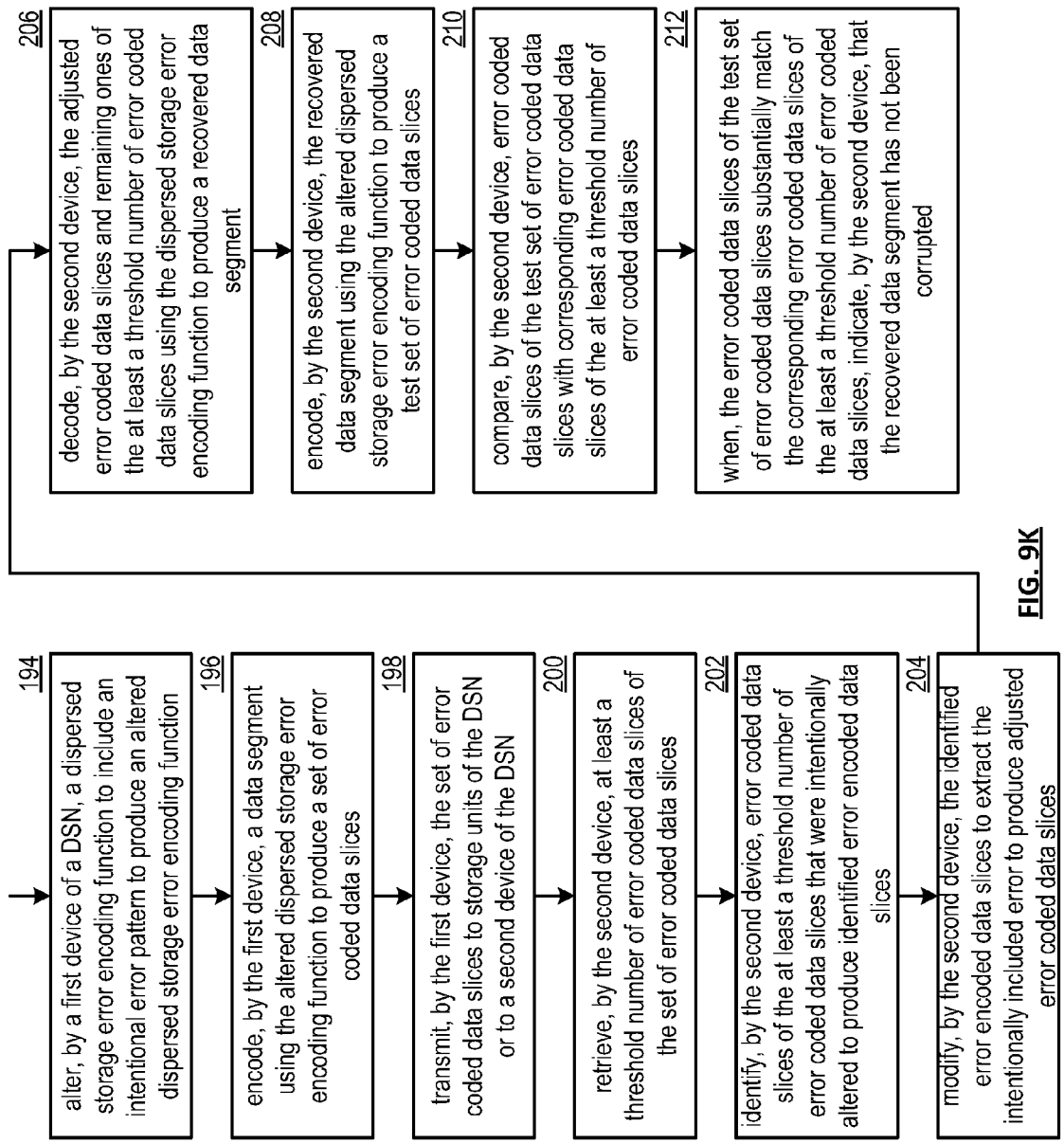
Figure 11B:
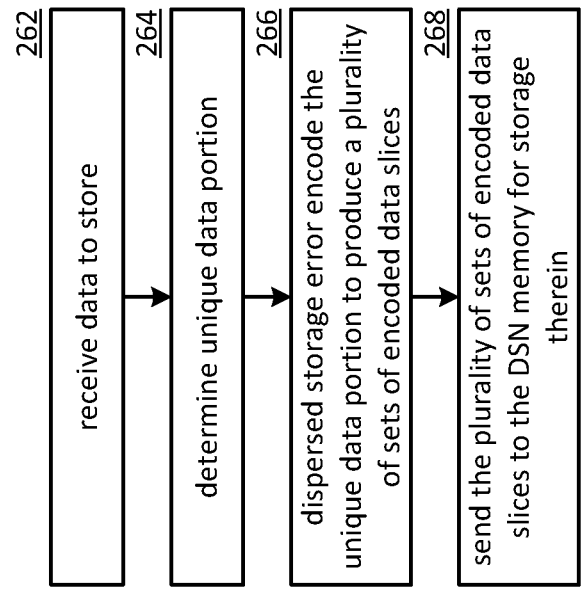
Figure 11A:
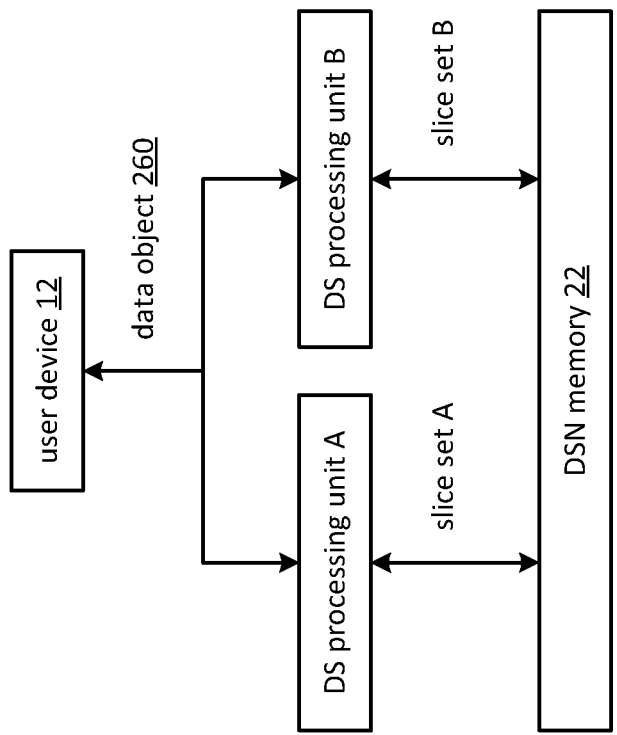
Figure 12B:
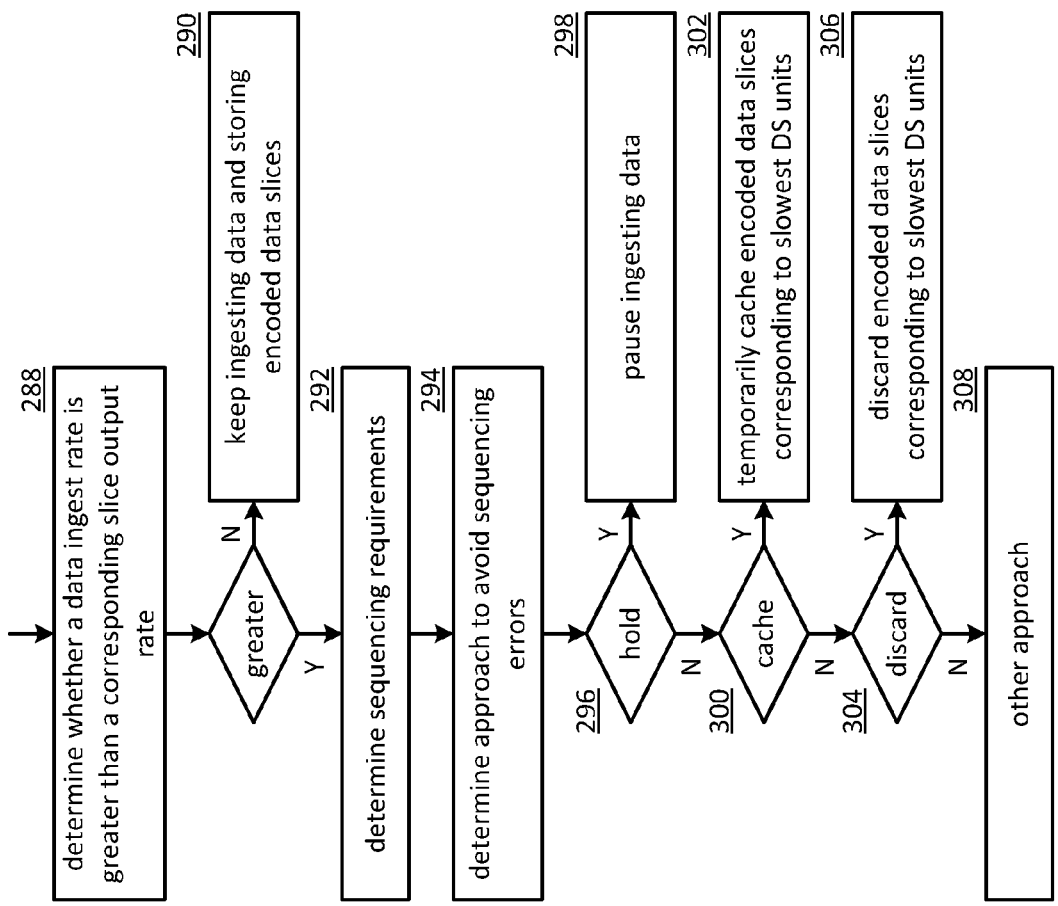
Figure 13B:
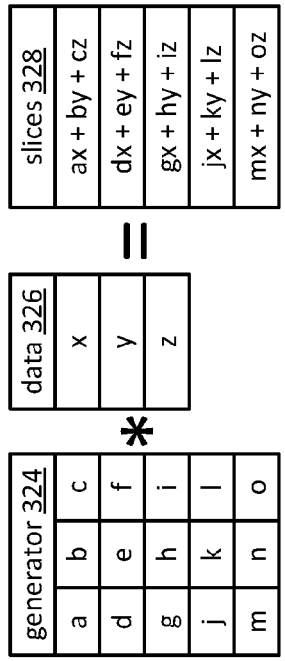
Figure 13C:
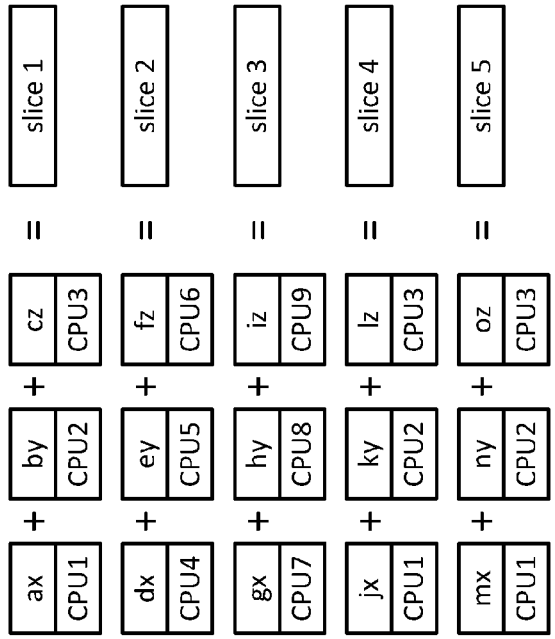
Figure 13A:
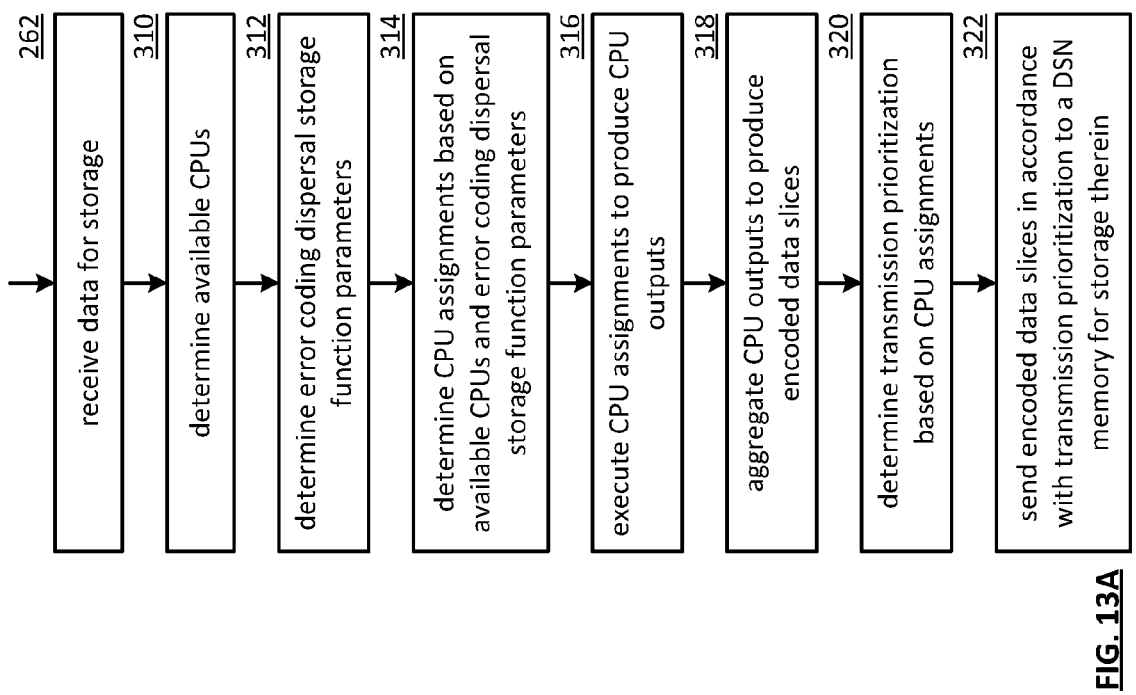
Figure 14:
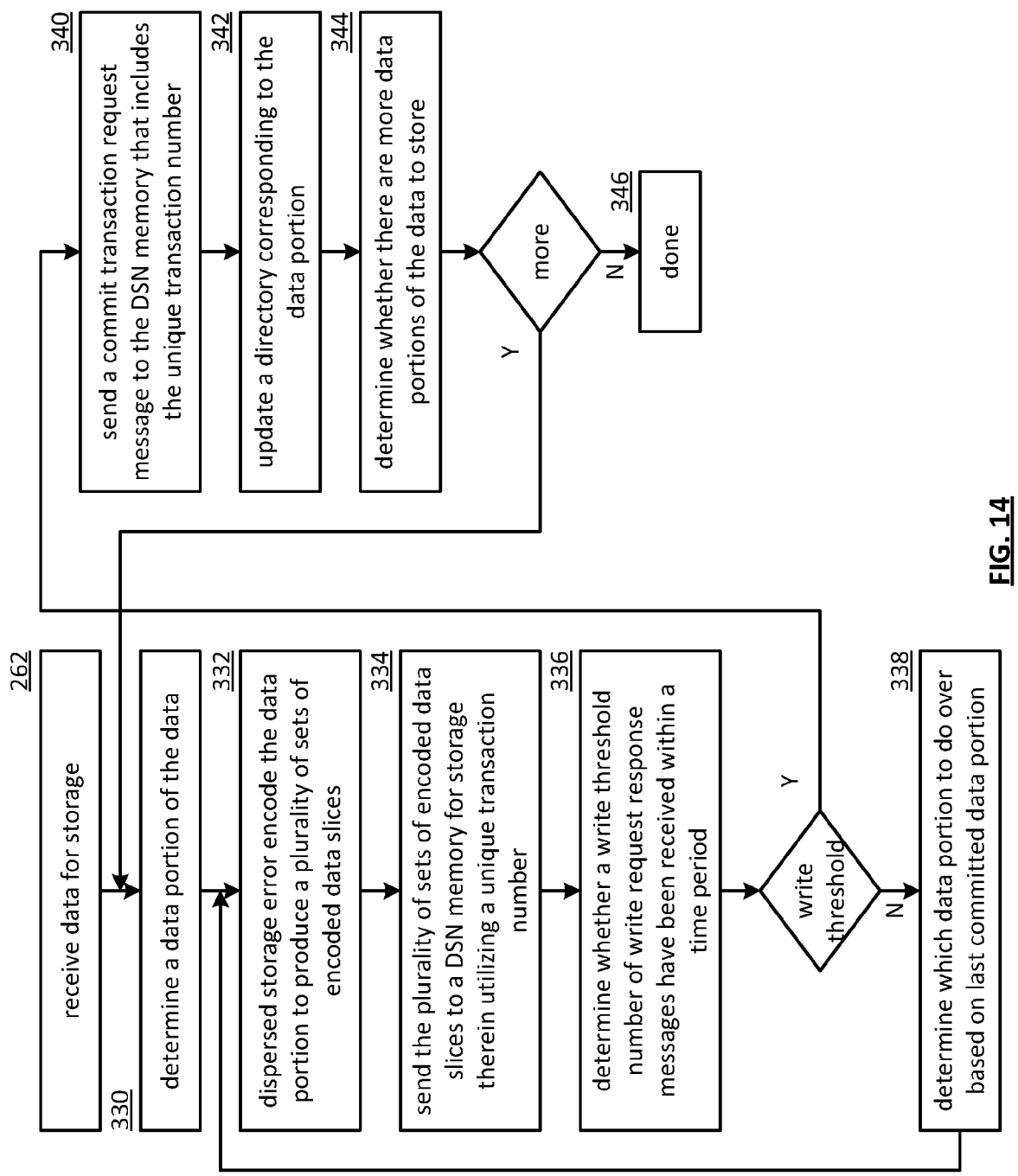
Figure 15:
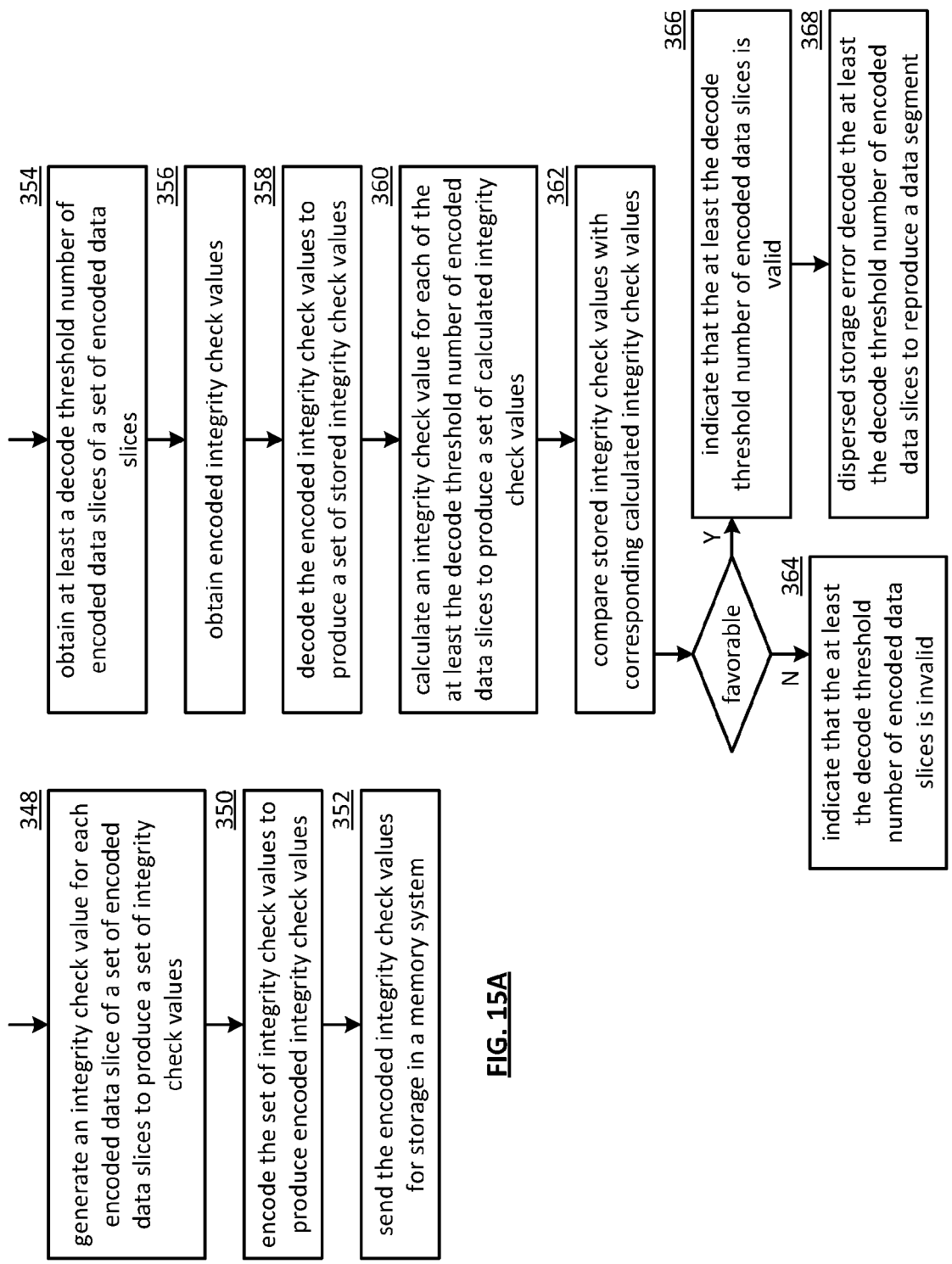
Figure 16:
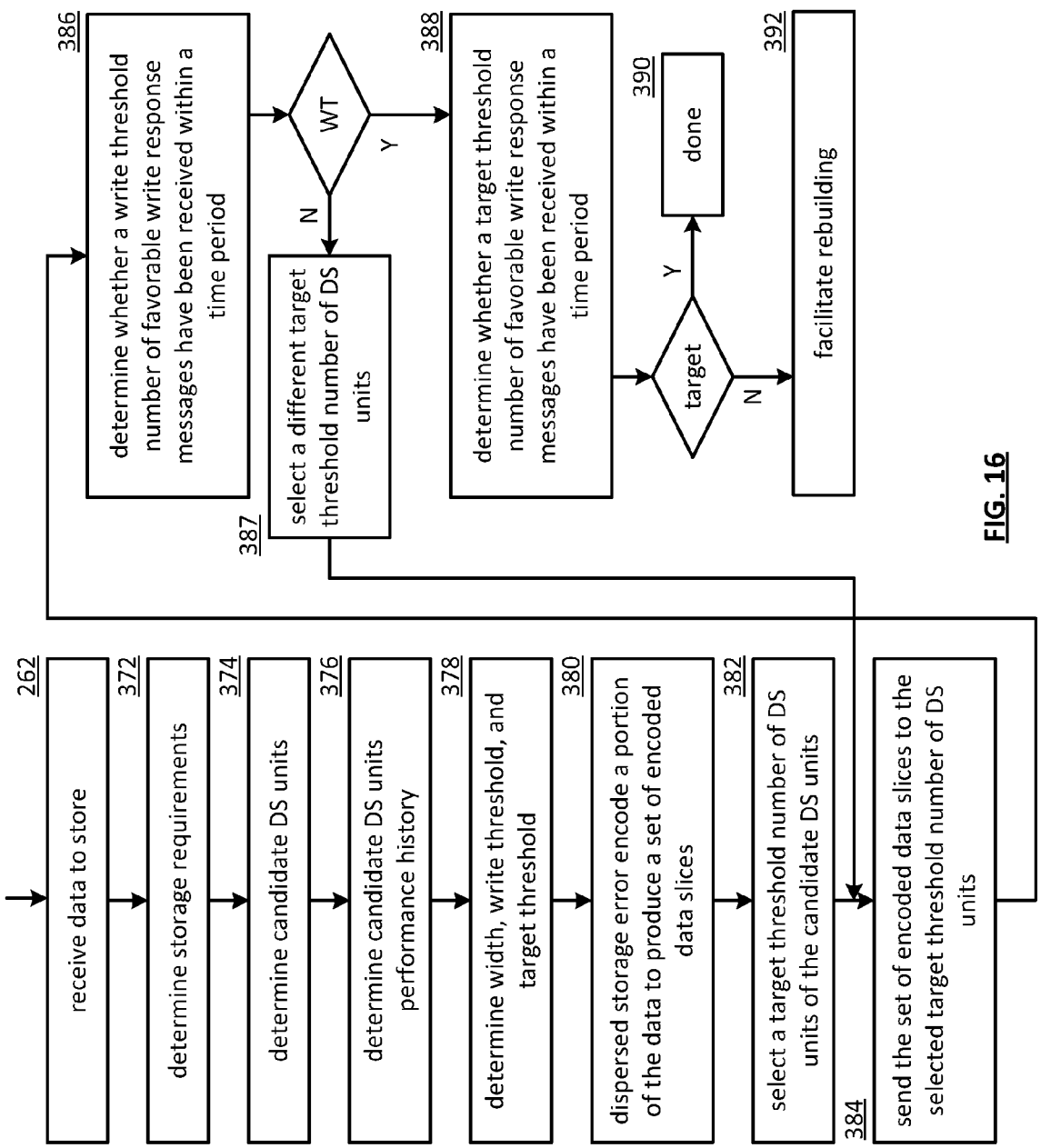
Figure 17:
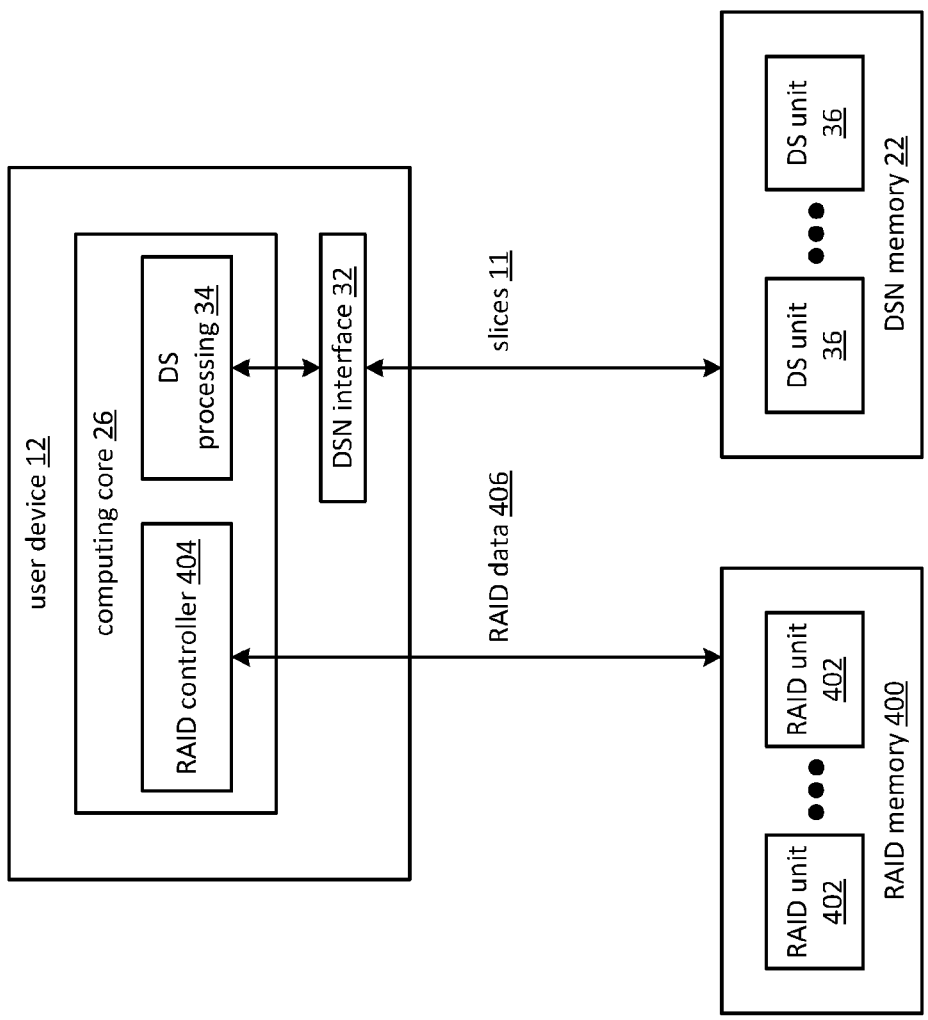
Figure 18A:
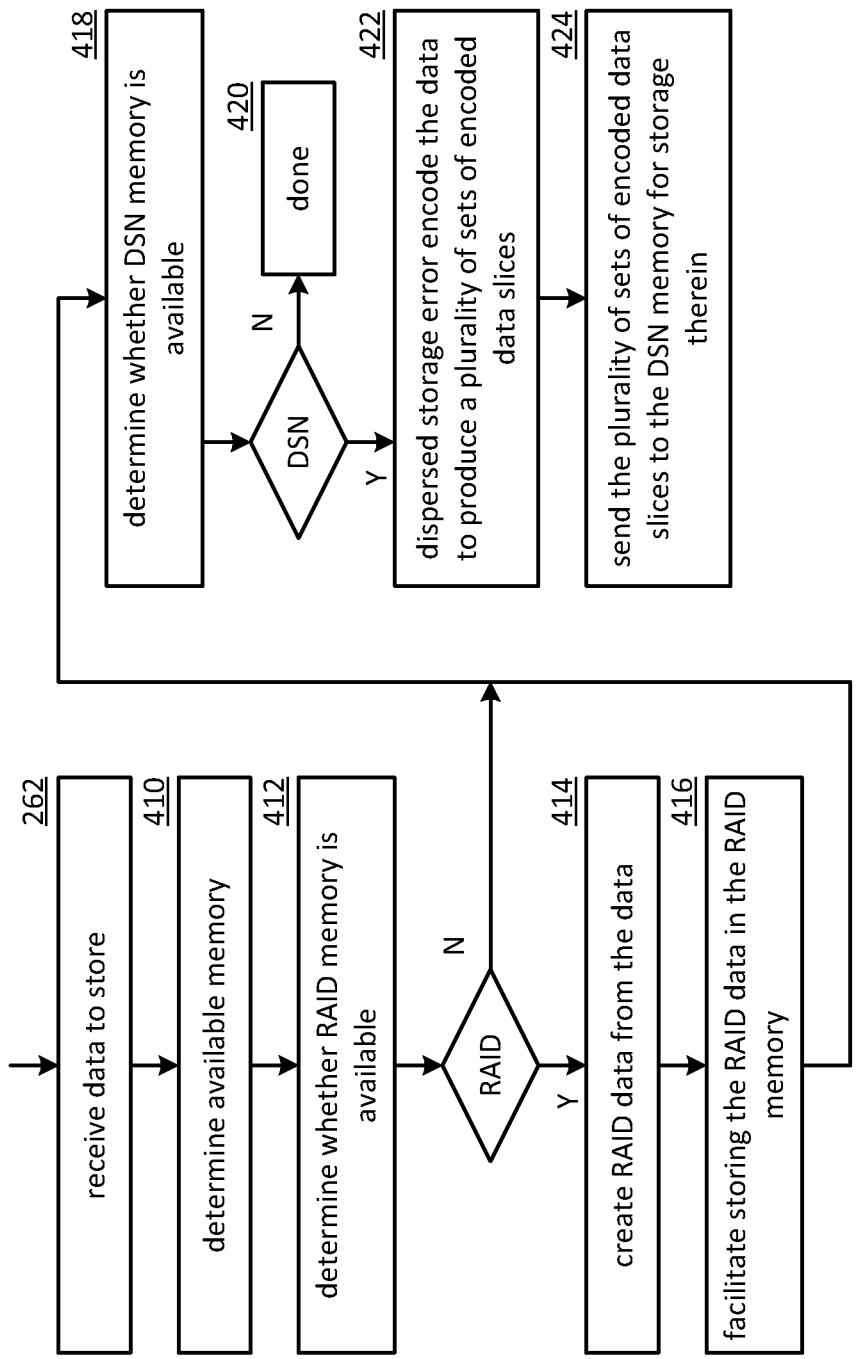
Figure 18C:
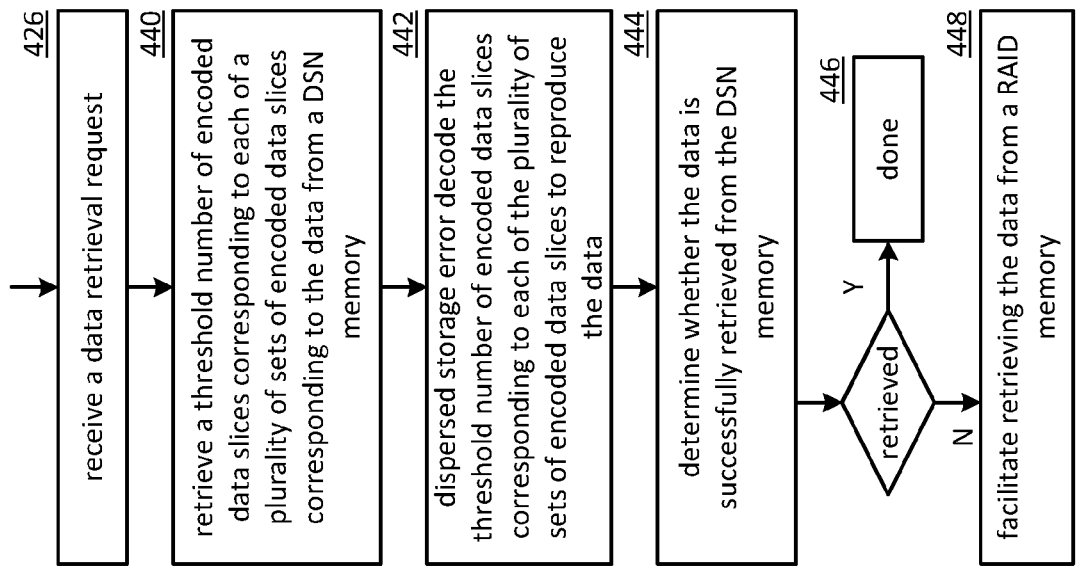
Figure 18B:
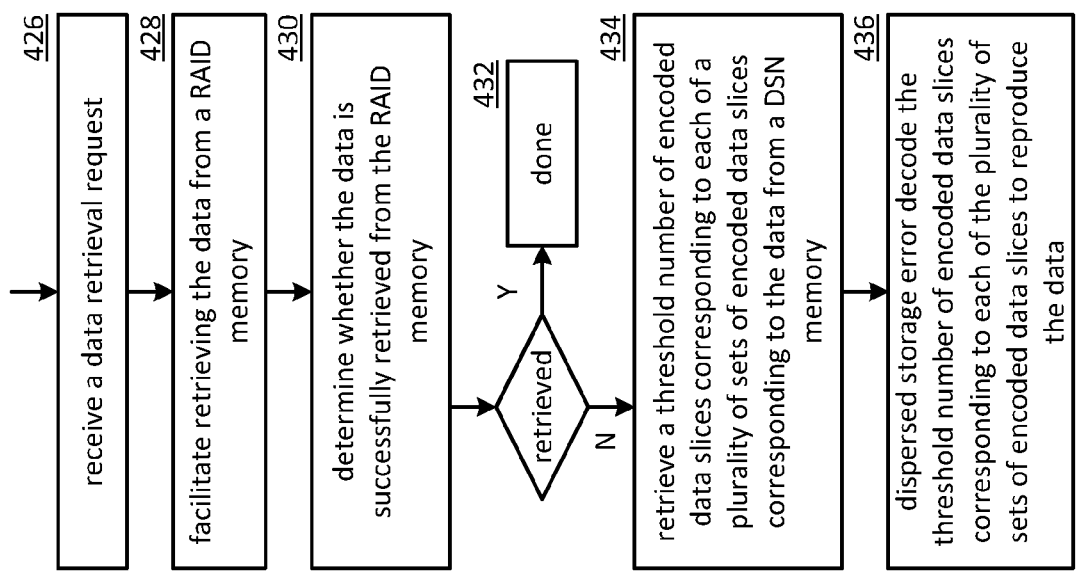

FIGS. 9B-C are examples of processing a set of encoded data slices in accordance with the present invention;

FIG. 9D is a diagram illustrating an example of encoding a data segment into a plurality of data blocks in accordance with the present invention;

FIG. 9E is a diagram illustrating an example of matrix multiplication of an encoding matrix and a data matrix to produce a coded matrix in accordance with the present invention;

FIGS. 9F-H are diagrams illustrating further examples of matrix multiplication of an encoding matrix and a data matrix to produce a coded matrix in accordance with the present invention;

FIG. 9I is a diagram illustrating an example of matrix multiplication of an inverse square decoding matrix and a reduced recovered coded matrix to produce a recovered data matrix in accordance with the present invention;

FIG. 9J is a diagram illustrating an example of matrix multiplication of a group of square decoding matrices and a group of reduced recovered coded matrices to produce a group of recovered data matrices in accordance with the present invention;

FIG. 9K is a flowchart illustrating an example of detecting data corruption in accordance with the present invention;

FIG. 10A is a flowchart illustrating an example of storing encoded data slices in accordance with the present invention;

FIG. 10B is an example table illustrating a storage method table in accordance with the present invention;

FIG. 11A is another schematic block diagram of another embodiment of a computing system in accordance with the present invention;

FIG. 11B is a flowchart illustrating an example of dispersed storage error encoding data in accordance with the present invention;

FIG. 12A is a flowchart illustrating an example of storing data in accordance with the present invention;

FIG. 12B is a flowchart illustrating another example of storing data in accordance with the present invention;

FIG. 13A is a flowchart illustrating an example of producing encoded data slices in accordance with the present invention;

FIG. 13B is an algorithm diagram illustrating an example of encoding data in accordance with the present invention;

FIG. 13C is a central processing unit (CPU) task map illustrating an example of determining CPU assignments in accordance with the present invention;

FIG. 14 is a flowchart illustrating another example of storing data in accordance with the present invention;

FIG. 15A is a flowchart illustrating an example of producing integrity check information in accordance with the present invention;

FIG. 15B is a flowchart illustrating an example of utilizing integrity check information in accordance with the present invention;

FIG. 16 is a flowchart illustrating another example of storing data in accordance with the present invention;

FIG. 17 is another schematic block diagram of another embodiment of a computing system in accordance with the present invention;

FIG. 18A is a flowchart illustrating another example of storing data in accordance with the present invention;

FIG. 18B is a flowchart illustrating an example of retrieving data in accordance with the present invention;

FIG. 18C is a flowchart illustrating another example of retrieving data in accordance with the present invention;

FIG. 19A is a flowchart illustrating another example of retrieving data in accordance with the present invention; and FIG. 19B is a flowchart illustrating another example of retrieving data in accordance with the present invention.

DETAILED DESCRIPTION OF THE INVENTION

Figure 1:
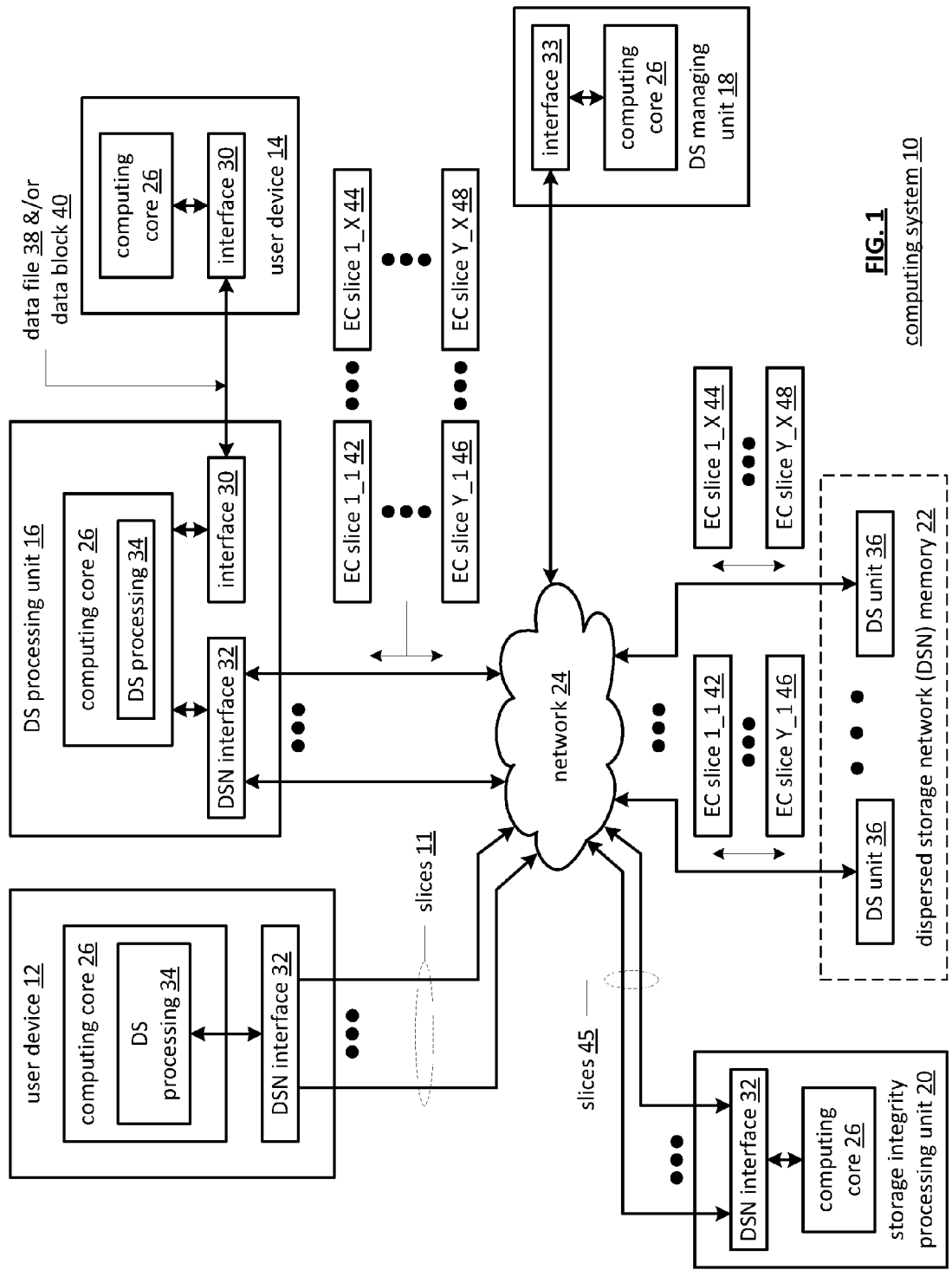
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19B.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-19B.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
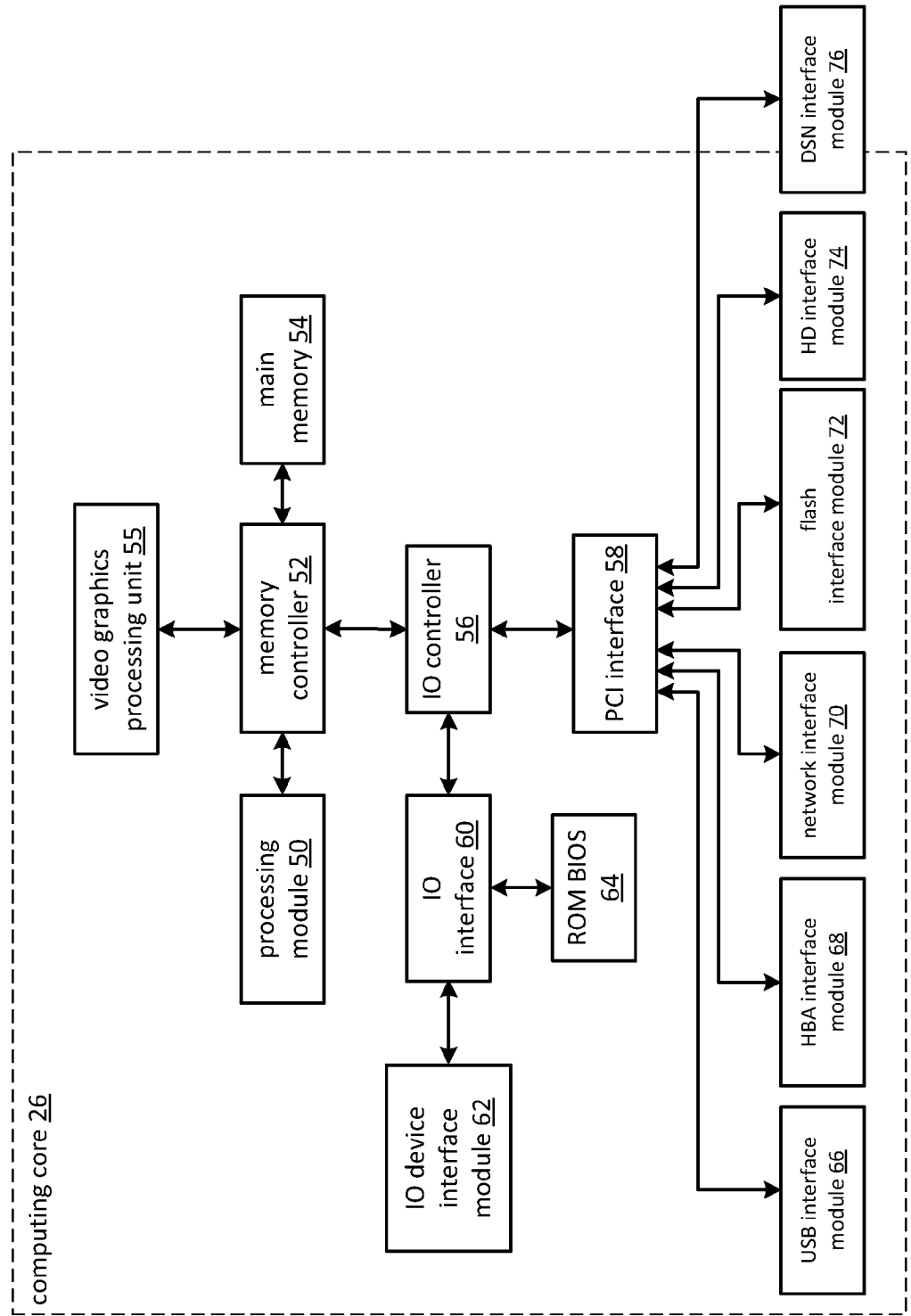
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-19B.

Figure 3:
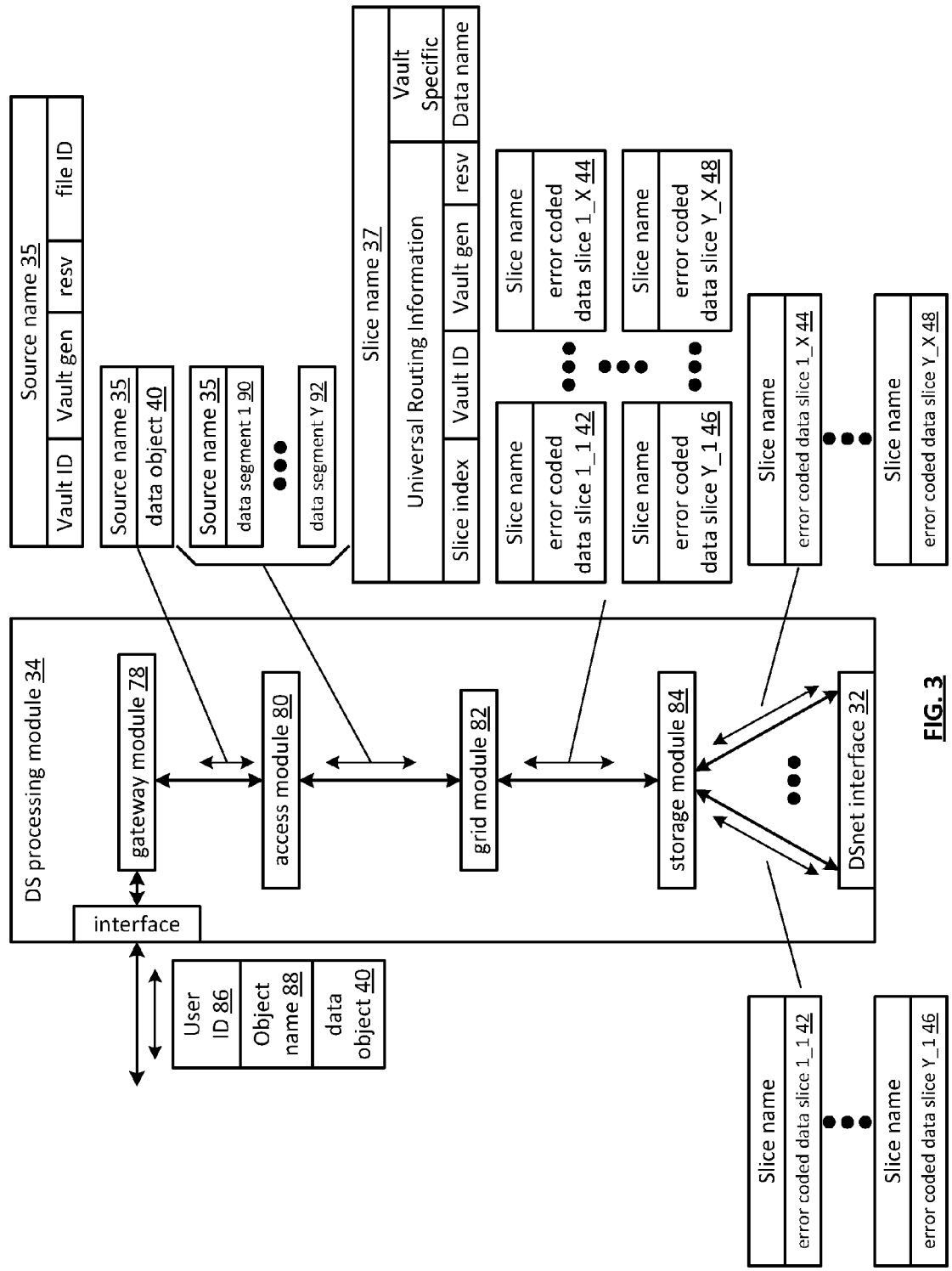
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the DS management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-48.

The value X, or the number of pillars (e.g., X=16), is chosen as a parameter of the error coding dispersal storage function. Other parameters of the error coding dispersal storage function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
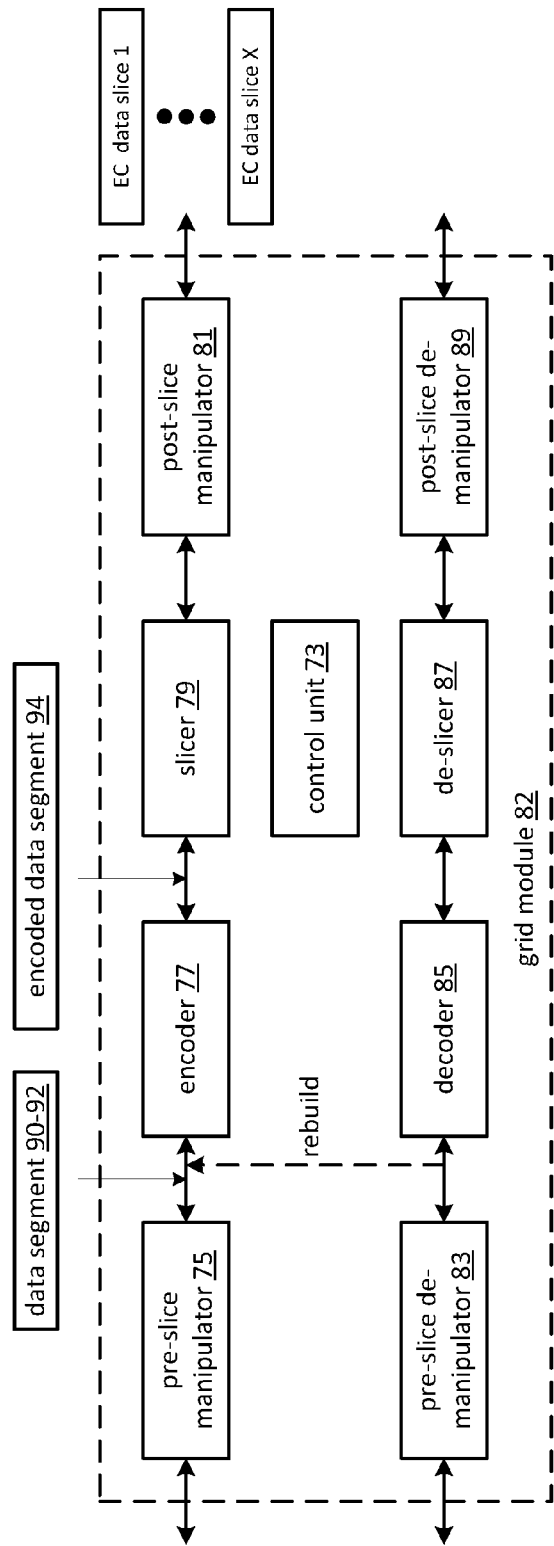
FIG. 4 is a schematic block diagram of an embodiment of a grid module in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 90-92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 90-92, the same encoding algorithm for the data segments 90-92 of a data object, or a combination thereof.

The encoded data segment 94 is of greater size than the data segment 90-92 by the overhead rate of the encoding algorithm by a factor of X/T, where X is the width or number of slices, and T is the read threshold. In this regard, the corresponding decoding process can accommodate at most X-T missing EC data slices and still recreate the data segment 90-92. For example, if X=16 and T=10, then the data segment 90-92 will be recoverable as long as 10 or more EC data slices per segment are not corrupted.

The slicer 79 transforms the encoded data segment 94 into EC data slices in accordance with the slicing parameter from the vault for this user and/or data segment 90-92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
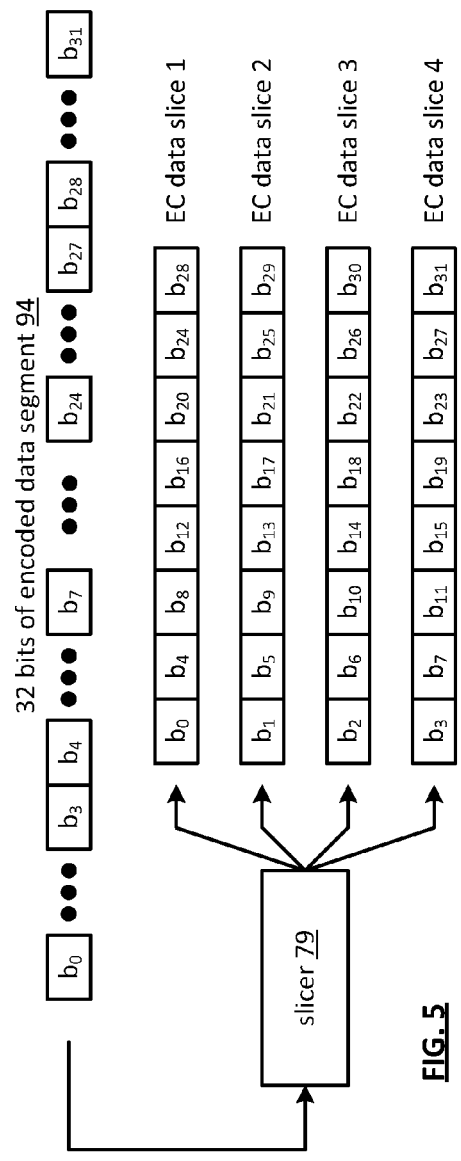
FIG. 5 is a diagram of an example embodiment of error coded data slice creation in accordance with the present invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
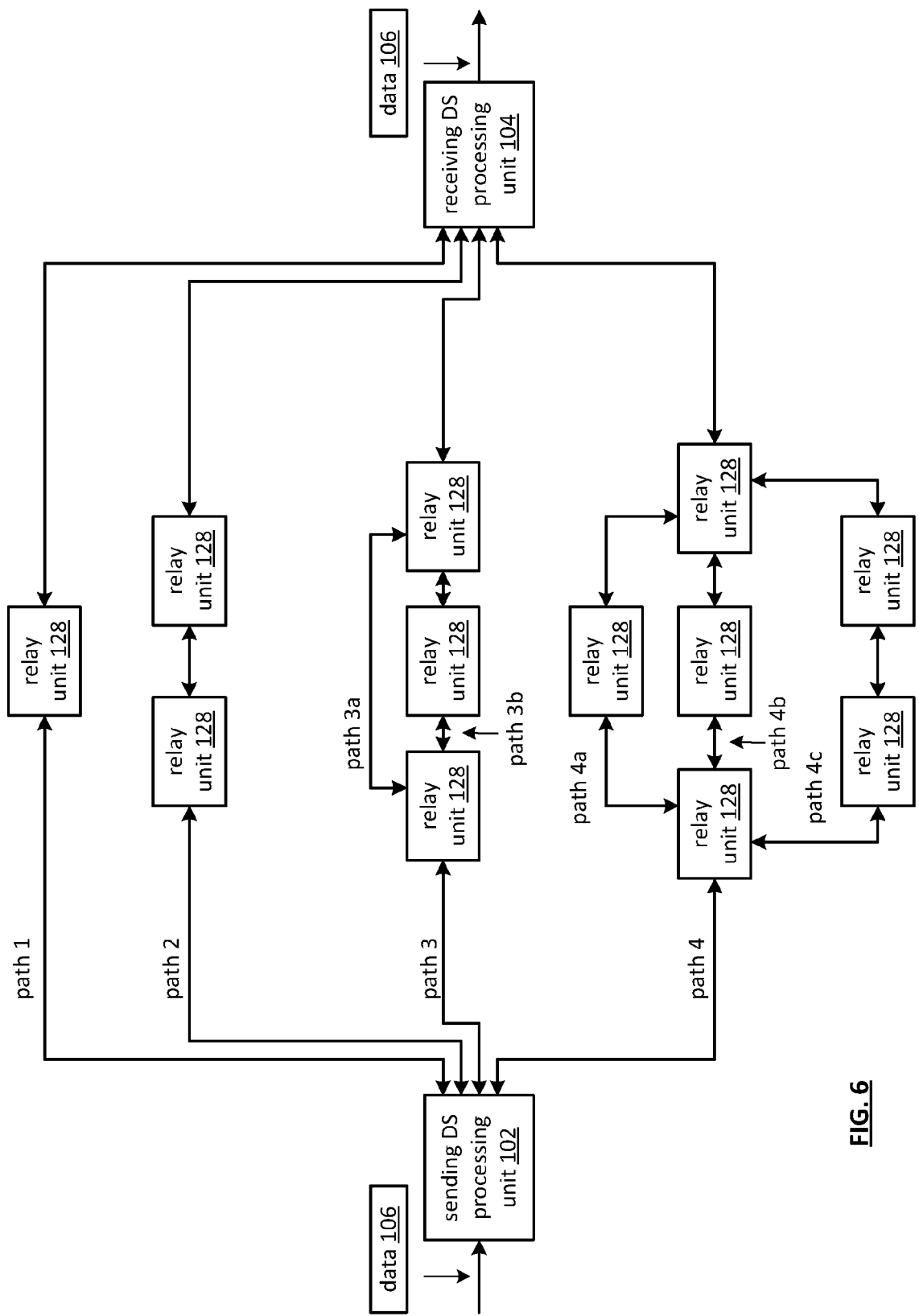
FIG. 6 is a schematic block diagram of an embodiment of a communication system in accordance with the present invention.

FIG. 6 is a schematic block diagram of an embodiment of a communication system. The system includes a sending dispersed storage (DS) processing unit 102, a plurality of relay units 128, and a receiving DS processing unit 104. In an implementation example, the sending DS processing unit 102, at least some of the plurality of relay units 128, and the receiving DS processing unit 104 include a DS processing module 34. The sending DS processing unit 102, the plurality of relay units 128, and the receiving DS processing unit 104 operate to communicate data.

A plurality of routing paths 1-4 may be provided by the plurality of relay units 128 and a topology of connectivity between the sending DS processing unit 102, the plurality of relay units 128, and the receiving DS processing unit 104. Routing path 1 includes one relay unit 128 between the sending DS processing unit 102 and the receiving DS processing unit 104. Routing path 2 includes two relay units 128 between the sending DS processing unit 102 and the receiving DS processing unit 104.

A plurality of routing sub-paths may be provided by at least some of the plurality of relay units 128 and a topology of connectivity between the at least some of the plurality of relay units 128. For example, routing path 3 includes three relay units 128 between the sending DS processing unit 102 and the receiving DS processing unit 104, wherein a routing sub-path 3a includes two of the three relay units 128 and routing sub-path 3b includes all three of the three relay units 128. As another example, routing path 4 includes six relay units 128 between the sending DS processing unit 102 and the receiving DS processing unit 104, wherein routing sub-path 4a includes three of the six relay units 128, routing sub-path 4b includes three of the six relay units 128, and routing sub-path 4c includes four of the six relay units 128.

The sending DS processing unit 102 obtains data 106 and sends data 106 utilizing one or more of the plurality of routing paths 1-4 to communicate the data 106 to the receiving DS processing unit 104. In an example of operation, the sending DS processing unit 102 receives data 106. Next, the sending DS processing unit 102 determines one or more of communications requirements (e.g., a reliability level) and routing path quality of service information (e.g., reliability history, a future reliability estimate). The sending DS processing unit 102 selects a set of routing paths of the plurality of routing paths to produce a selected set of routing paths based on the communications requirements and the routing path quality of service information. Such a selected set of routing paths may include one or more sub-paths. Next, the sending DS processing unit 102 dispersed storage error encodes the data 106 to produce a plurality of sets of encoded data slices.

The sending DS processing unit 102 determines a path assignment scheme based on the communications requirements and the routing path quality of service information. The sending DS processing unit 102 assigns encoded data slices of the plurality of sets of encoded data slices corresponding to each common pillar to a corresponding path of the selected set of routing paths utilizing the path assignment scheme. The sending DS processing unit 102 sends the plurality of sets of encoded data slices to the receiving DS processing unit 104 via the selected set of routing paths in accordance with the path assignment scheme. For instance, the sending DS processing unit 102 sends more slices via path 4 than via path 1 when the sending DS processing unit 102 determines that the path 4 slices require a more reliable path than the path 1 slices. The method of operation of the sending DS processing unit 102, the plurality of relay units 128, and the receiving DS processing unit 104 is discussed in greater detail with reference to one or more of FIGS. 7A-19B.

In an example of operation, the sending DS processing unit 102 (e.g., a first device) determines an error coding distributed routing protocol and transmits a set of encoded data slices (e.g., slices 11), identity of the receiving DS processing unit 104 (e.g., a second device), and the error coding distributed routing protocol to a network (e.g., plurality of relay units 128, the receiving DS processing unit 104), wherein the set of encoded data slices represents data that has been dispersed storage error encoded. The error coding distributed routing protocol includes at least one of identity of the initial plurality of routing paths, a number of routing paths, a number of sub-sets of the set of encoded data slices, the desired routing performance for one or more of the sub-sets of the set of encoded data slices, a request for multiple path transmission of the set of encoded data slices, a capacity estimate of the initial plurality of routing paths, a priority indicator for at least one of the sub-sets, a security indicator for at least one of the sub-sets, and a performance indicator for at least one of the sub-sets.

In the example of operation continued, the network routes a plurality of sub-sets of the set of encoded data slices via an initial plurality of routing paths towards the second device in accordance with the error coding distributed routing protocol. Next, the network compares anticipated routing performance of the routing of the plurality of sub-sets with a desired routing performance (e.g., of the error coding distributed routing protocol). The comparing the anticipated routing performance includes a link of a plurality of links of the routing path, determining the anticipated routing performance of the link, comparing the anticipated routing performance of the link with a corresponding portion of the desired routing performance, and when the comparison of the anticipated routing performance of the link with the corresponding portion of the desired routing performance is unfavorable, indicating that the comparison of the anticipated routing performance of the routing of the plurality of sub-sets with the desired routing performance is unfavorable.

In the example of operation continued, the network alters the routing path to obtain a favorable comparison when the comparison of a routing path of the initial plurality of routing paths is unfavorable. For example, the network determines the routing paths to be unfavorable when an absolute value of a difference between the anticipated routing performance and the desired routing performance is greater than a performance threshold. The altering the routing path includes dispersed storage error encoding an encoded data slice of a corresponding sub-set of the plurality of sub-sets to produce a set of encoded data sub-slices, determining a plurality of sub-routing paths, and routing the set of encoded data sub-slices to the second device via the plurality of sub-routing paths. The altering the routing path further includes at least one of selecting a lower latency routing path, selecting a higher data rate routing path, selecting a routing path with higher capacity, selecting a routing path with a lower error rate, selecting a routing path with a higher cost, selecting a higher latency routing path, selecting a lower data rate routing path, selecting a routing path with a higher error rate, selecting a routing path with a lower cost, and selecting a routing path with lower capacity.

In the example of operation continued, the receiving DS processing unit 104 receives at least some of the set of encoded data slices from the network and when at least a threshold number (e.g., a decode threshold number) of encoded data slices have been received, the DS processing unit 104 decodes the at least a threshold number of encoded data slices to reproduce the data 106.

Figure 7A:
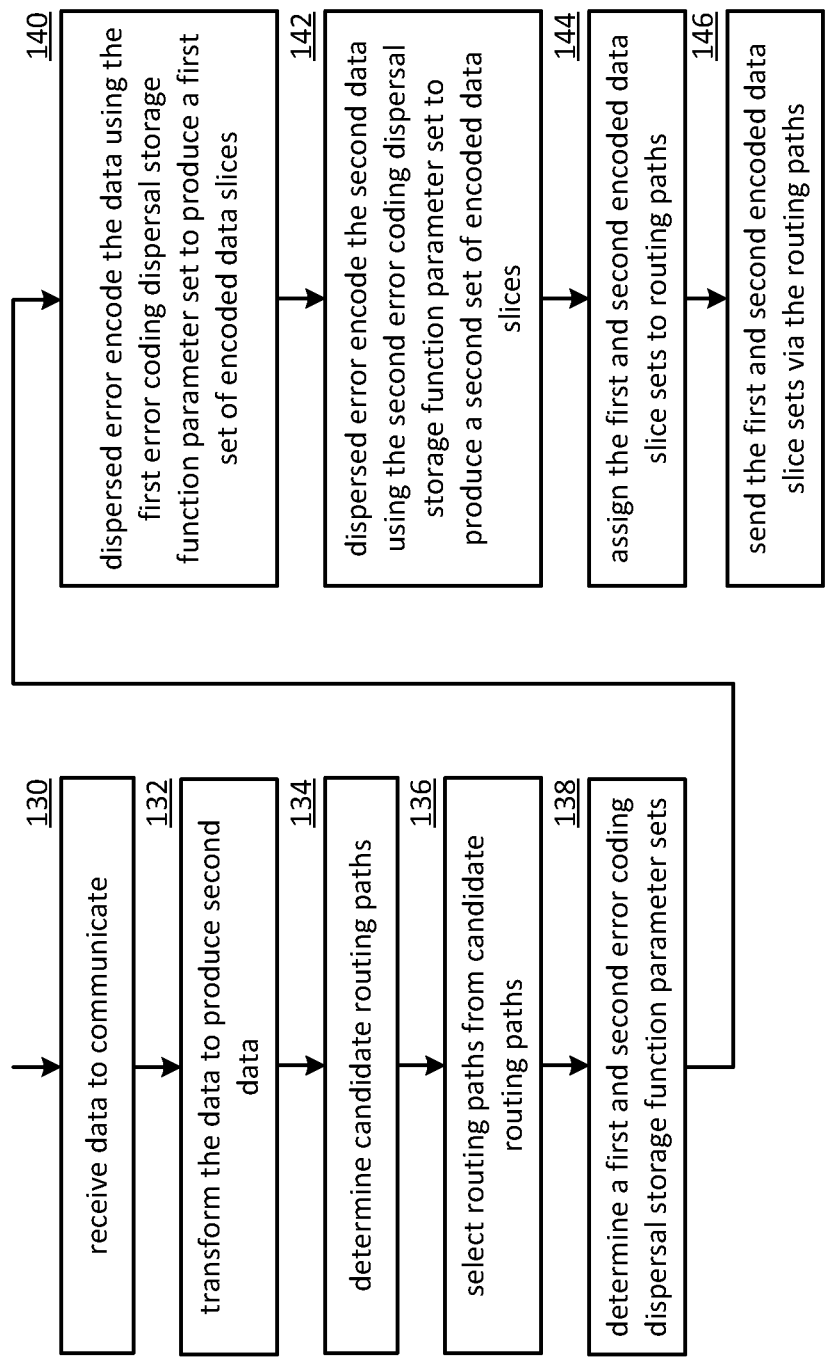
FIG. 7A is a flowchart illustrating an example of sending data as slices in accordance with the present invention.

FIG. 7A is a flowchart illustrating an example of sending data as slices. The method begins with step 130 where a processing module (e.g., of a sending dispersed storage (DS) processing unit) receives data to communicate. The data may include any type of analog or digital representation of data content, media content, video, audio, speech, word processing files, financial records, software, etc. For example, the processing module facilitates communications of the data to a receiving DS processing unit, via a network and a plurality of relay units, where the data is re-produced by the receiving DS processing unit.

The method continues at step 132 where the processing module transforms the data to produce second data. The transforming includes one or more of data compression, appending bits, and deleting bits. The processing module may determine a transformation type based on one or more of a data type indicator, a data analysis, a data size indicator, a priority indicator, a security indicator, buffer bits, authentication indicator, performance indicator, a lookup, a message, and a predetermination. For example, the processing module determines the transformation to be video compression when the processing module determines that the data type indicator indicates video.

The method continues at step 134 where the processing module determines candidate routing paths. The routing paths represent one or more communications paths from the processing module to a receiving entity (e.g., the receiving DS processing unit). The determination may be based on one or more of receiving a message, a lookup, a query, a plurality of communications ping requests and responses, a test, a routing table, a message from a router, a message from a relay unit, and a command. For example, the processing module determines candidate routing paths based on a query of units functionally or topologically (e.g., architecturally) between the processing module and the receiving entity. As another example, the processing module determines candidate routing paths based on receiving routing table information from one or more relay units.

The method continues at step 136 where the processing module selects routing paths from the candidate routing paths. The selection may be based on one or more of the encoded data slices, the routing path quality of service information, the candidate routing paths, routing requirements, historical routing path performance, estimated routing path performance, a message, a lookup, a predetermination, and a command. For example, the processing module selects routing paths associated with favorable historical routing path reliability performance when a routing requirement includes high reliability. As another example, the processing module selects routing paths associated with favorable historical routing path high speed performance when a routing requirement includes high speed.

The method continues at step 138 where the processing module determines first and second error coding dispersal storage function parameter sets that correspond to the data and second data. The determination may be based on one or more of routing path quality of service information, the candidate routing paths, the selected routing paths, the data, the second data, a communications requirement, a data type indicator, a capacity estimate of the selected routing paths, a priority indicator, a security indicator, a performance indicator, an estimated routing path performance indicator, a lookup, and a message. For example, the processing module determines the first error coding dispersal storage function parameters to include a pillar width and a threshold to favor reliability for transmission of the data when the data represents high quality video information. For instance, the processing module selects a pillar width of 15 and a threshold of 8 when the communications requirement of the data includes a high-reliability requirement. As another example, the processing module determines the second error coding dispersal storage function parameters to include a pillar width and a threshold to favor efficiency over reliability for transmission of the second data when the second data represents lower priority video information. For instance, the processing module selects a pillar width of 10 and a threshold of 8 when the communications requirement of the second data includes a high-efficiency requirement.

The method continues at step 140 where the processing module dispersed storage error encodes the data utilizing an error coding dispersal storage function and in accordance with the first error coding dispersal storage function parameter set to produce a first set of encoded data slices. The method continues at step 142 where the processing module dispersed storage error encodes the second data utilizing the error coding dispersal storage function and in accordance with the second error coding dispersal storage function parameter set to produce a second set of encoded data slices. The method continues at step 144 where the processing module assigns the first and second encoded data slice sets to the selected routing paths. The assigning may be based on one or more of the first and second encoded data slice sets, the routing path quality of service information, the candidate routing paths, the selected routing paths, routing requirements, historical routing path performance, estimated routing path performance, a message, a lookup, a predetermination, and a command. For example, the processing module assigns the first set of encoded data slices to routing paths associated with lower reliability when the first error coding dispersal storage function parameter set is associated with high reliability. As another example, the processing module assigns the second set of encoded data slices to routing paths associated with higher reliability when the second error coding dispersal storage function parameter set is associated with high efficiency and low reliability. The method continues at step 146 where the processing module sends the first and second encoded data slice sets to the receiving entity via the selected routing paths.

Figure 7B:
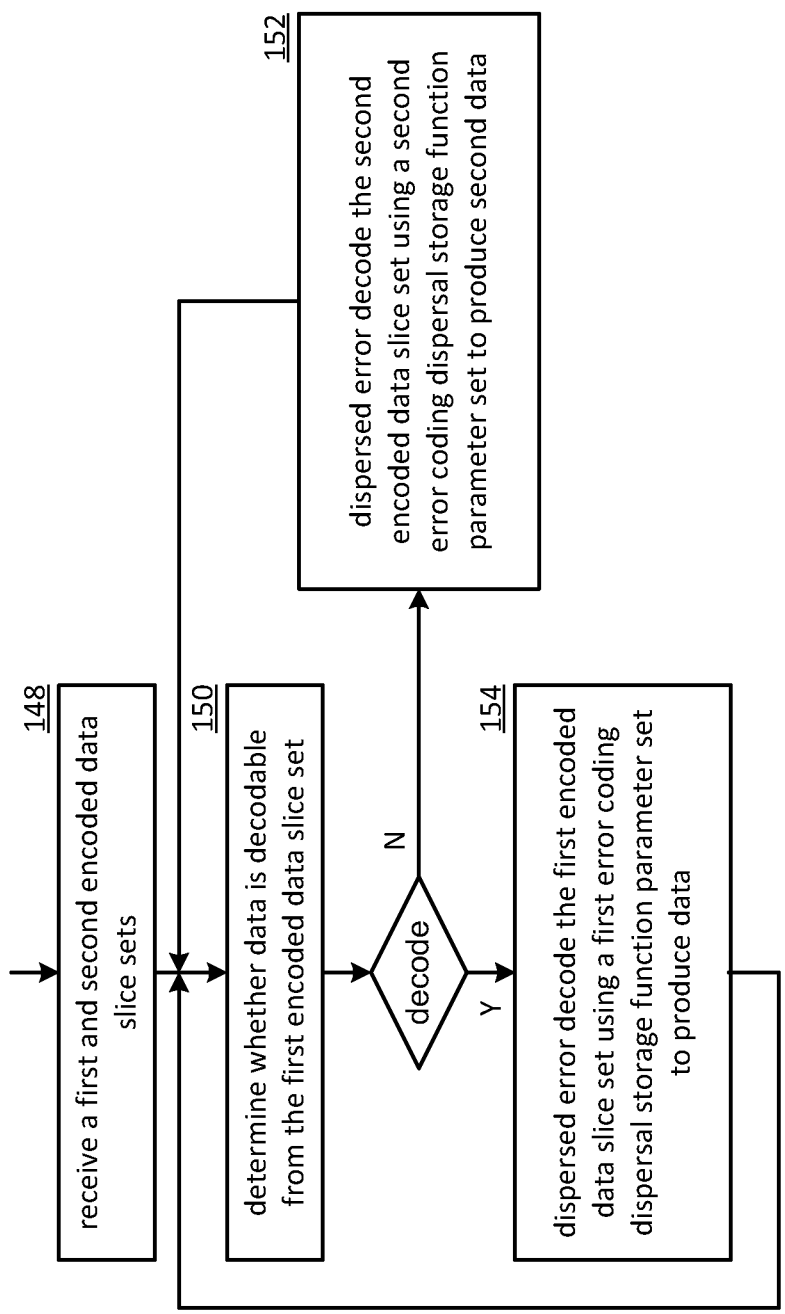
FIG. 7B is a flowchart illustrating an example of dispersed storage error decoding encoded data slices in accordance with the present invention.

FIG. 7B is a flowchart illustrating an example of dispersed storage error decoding encoded data slices. The method begins with step 148 where a processing module (e.g., a dispersed storage (DS) processing unit) receives a first and second encoded data slice sets. The second encoded data slice set may represent data that is encoded as the first set of encoded data slices, wherein the first and second encoded data slice sets are dispersed storage or encoded using different error coding dispersal storage function parameters. For example, the first set of encoded data slices may represent a high quality version of a video while the second set of encoded data slices may represent a lower quality version of the video.

The method continues at step 150 where the processing module determines whether data is decodable from the first encoded data slice set. The determination may be based on one or more of counting a number of available slices per data segment, comparing the number of available slices per data segment to a read threshold, obtaining a received slice quality indicator, a query, a test, and a message. For example, the processing module determines that data is decodable from the first encoded data slice set when the number of available first encoded data slices per data segment is equal to or greater than the read threshold.

The method branches to step 154 when the processing module determines that the data is decodable from the first encoded data slice set. The method continues to step 152 when the processing module determines that the data is not decodable from the first encoded data slice set. The method continues at step 152 where the processing module dispersed error decodes the second encoded data slice set using a second error coding dispersal storage function parameter set to produce second data. For example, the processing module decodes the second encoded data slice set to produce a lower quality video as the second data when it is not possible to decode the first encoded data slice set to produce a higher quality video. The method loops back to step 150. The method continues at step 154 where the processing module dispersed error decodes the first encoded data slice set using a first error coding dispersal storage function parameter set to produce the data. The method loops back to step 150.

Figure 8A:
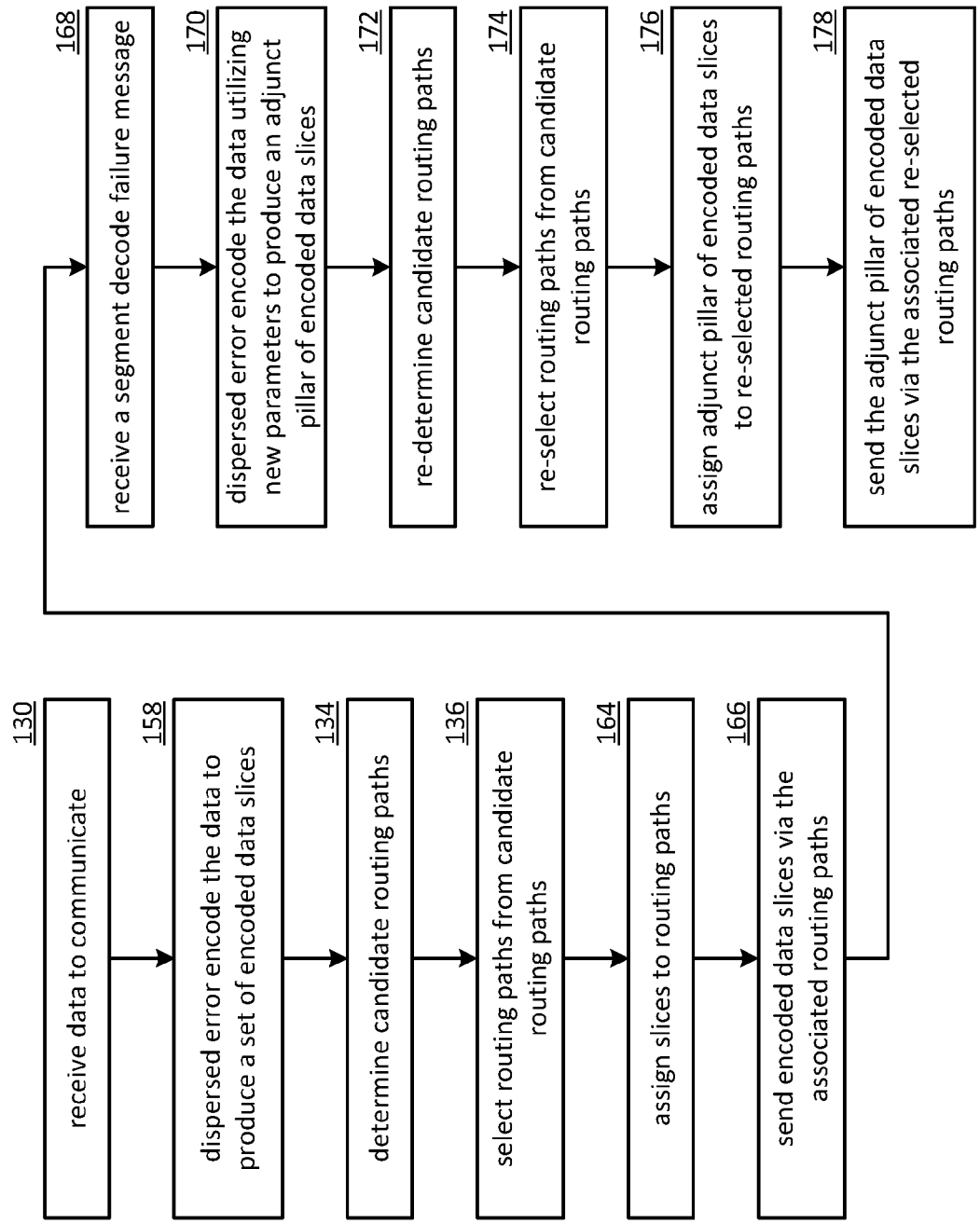
FIG. 8A is a flowchart illustrating another example of sending data as slices in accordance with the present invention.

FIG. 8A is another flowchart illustrating another example of sending data as slices, which includes similar steps to FIG. 7A. The method begins with step 130 of FIG. 7A where a processing module (e.g., of a sending dispersed storage (DS) processing unit) receives data to communicate. In an example, the processing module facilitates communications of the data to a receiving entity (e.g., a receiving DS processing unit), via a network and a plurality of relay units, where the data is re-produced by the receiving entity.

The method continues at step 158 where the processing module dispersed storage error encodes the data utilizing an error coding dispersal storage function to produce a set of encoded data slices. The method continues with steps 134-136 of FIG. 7A where the processing module determines candidate routing paths and selects routing paths from the candidate routing paths. The method continues at step 164 where the processing module assigns a set of encoded data slices to the selected routing paths. The assigning may be based on one or more of the encoded data slices, quality of service information, the selected routing paths, and a quality of service policy. For example, the processing module assigns slices associated with pillars 1-10 to a first 10 selected routing paths and assigns slices associated with pillars 11-15 to a second 5 routing paths and a slice associated with pillar 16 is not assigned. The method continues at step 166 where the processing module sends the set of encoded data slices to the receiving entity via the selected routing paths in accordance with the assignment of the slices to the routing paths.

The method continues at step 168 where the processing module receives a segment decode failure message. The failure message may include one or more of a failure indicator, a data segment identifier, one or more slice names, a source name, a receiving DS processing unit identifier, one or more relay unit identifiers, and a routing path identifier. The method continues at step 170 where the processing module dispersed error encodes the data utilizing new error coding dispersal storage function parameters to produce an adjunct pillar of encoded data slices. For example, the processing module encodes the data with new parameters, wherein the new parameters includes a same decode threshold and a different pillar width that includes an additional one or more pillars (e.g., such that the previous slices are still usable to decode data segments).

The method continues at step 172 where the processing module re-determines candidate routing paths. For example, the processing module re-determines candidate routing paths to produce re-determined candidate routing paths, wherein a number of re-determined candidate routing paths is less than the candidate routing paths. As another example, the processing module re-determines candidate routing paths such that the resulting re-determined candidate routing paths do not include any failed paths as indicated by the data segment decode failure message. The method continues at step 174 where the processing module re-selects routing paths from the re-determined candidate routing paths. For example, the processing module re-selects routing paths that best meet a communication requirement.

The method continues at step 176 where the processing module assigns at least some adjunct pillar of encoded data slices to the re-selected routing paths. For example, the processing module assigns re-selected routing paths to the adjunct pillar of encoded data slices that represent information bytes to enable more rapid decoding of the data segment by the receiving DS processing unit. The method continues at step 178 where the processing module re-sends at least some of the adjunct pillar of encoded data slices via associated re-selected routing paths.

Figure 8B:
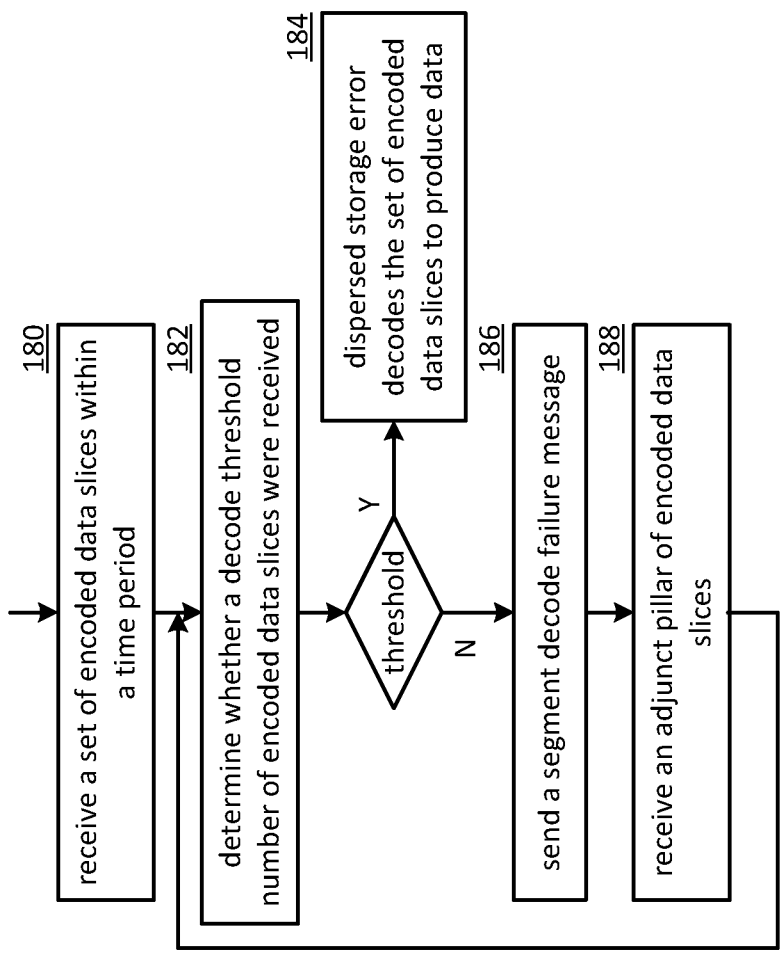
FIG. 8B is a flowchart illustrating another example of dispersed storage error decoding encoded data slices in accordance with the present invention.

FIG. 8B is a flowchart illustrating another example of dispersed storage error decoding encoded data slices. The method begins with step 180 where a processing module (e.g., a receiving dispersed storage (DS) processing unit) receives a set of encoded data slices within a time period. The method continues at step 182 where the processing module determines whether a decode threshold number of encoded data slices were received. The method branches to step 186 when the processing module determines that the decode threshold number of encoded data slices were not received. The method continues to step 184 when the processing module determines that the decode threshold number of encoded data slices were received. The method continues at step 184 where the processing module dispersed storage error decodes the set of encoded data slices to produce data.

The method continues at step 186 where the processing module sends a segment decode failure message when the processing module determines that the decode threshold number of encoded data slices were not received. The message may invoke a sending entity to send an additional slice of an additional pillar as described with reference to FIG. 8A. The method continues at step 188 where the processing module saves the set of encoded data slices received so far and receives an adjunct pillar of encoded data slices to attempt to decode the data by looping back to step 182.

FIG. 9A is a schematic block diagram of an embodiment of a dispersed storage network (DSN) that includes a dispersed storage (DS) processing module 34 of the first device and another DS processing module 34 of a second device, the network 24, and the DSN memory 22 of FIG. 1. The DSN memory 22 includes a plurality of DS units 36. The DS processing module 34 includes one or more of the grid module 82 of FIG. 4, an error injection module 189, and an integrity verification module 190 (e.g., of the second device).

The system functions to communicate a data segment 90 from the first device to the second device while detecting whether corruption of the data segment 90 has occurred.

In an example of operation, the first device DS processing module 34 alters a dispersed storage error encoding function to include an intentional error pattern 191 to produce an altered dispersed storage error encoding function. As an example, the grid module 82 of the first device converts the data segment 90 into a data matrix and generates a coded matrix from the data matrix and an encoding matrix, where the coded matrix includes encoded blocks (e.g., matrix multiplication to produce a set of slices 1-n). Next, the error injection module 189 of the first device inserts intentional error blocks into the coded matrix (e.g., of the set of slices 1-n) in accordance with the intentional error pattern 191 and arranges the encoded blocks and the intentional error blocks into a set of error coded data slices (e.g., eslice 1-n). As another example of altering the dispersed storage error encoding function, the grid module 82 of the first device generates an intentional error data matrix in accordance with the intentional error pattern 191 and generates an intentional error coded matrix from the intentional error data matrix and the encoding matrix, where the intentional error coded matrix includes intentional error blocks (e.g., matrix modification). Next, the error injection module 189 of the first device arranges the encoded blocks and the intentional error blocks into the set of error coded data slices (e.g., eslice 1-n). The method to alter the dispersed storage error coding function is discussed in greater detail with reference to FIGS. 9D-H.

The first device DS processing module 34 encodes the data segment using the altered dispersed storage error encoding function to produce the set of error coded data slices. As a result of the intentional error pattern, one or more error coded data slices of the set of error coded data slices is intentionally altered to include an error. Having produced the set of error coded data slices, the first device DS processing module 34 transmits, via the network 24, the set of error coded data slices to DS units 36 of the DSN memory 22 or to the second device DS processing module 34.

The second device DS processing module 34 retrieves at least a threshold number of error coded data slices of the set of error coded data slices (e.g., as received error coded slices, rxeslice 1-n) from the DS units 36 of the DSN memory 22 when the set of error coded data slices are stored in the DSN memory 22. The second device may be the same as the first device. Alternatively, the second device DS processing module 34 receives the at least a threshold number of error coded data slices of the set of error coded data slices from the first device DS processing module 34 when the first device DS processing module 34 transmits the set of error coded data slices to the second device DS processing module 34.

Having obtained the at least a threshold number of error coded data slices of the set of error coded data slices, the grid module 82 of the second device identifies, based on the intentional error pattern, error coded data slices of the at least a threshold number of error coded data slices that were intentionally altered to include the error to produce identified error coded data slices. The grid module 82 of the second device modifies the identified error coded data slices to extract the intentionally included error to produce adjusted error coded data slices. As a specific example, the grid module 82 of the second device arranges the at least a threshold number of error coded data slices into a recovered coded matrix of the encoded blocks and intentional error blocks and removes the intentional error blocks from the recovered coded matrix to produce the adjusted error coded data slices and remaining ones of the at least a threshold number of error coded data slices.

The decoder 85 of the second device decodes the adjusted error coded data slices and remaining ones of the at least a threshold number of error coded data slices using the dispersed storage error encoding function to produce a recovered data segment 192. The method to decode is discussed in greater detail with reference to FIGS. 9I-J. The encoder 77 and the error injection module 189 of the second device encodes the recovered data segment using the altered dispersed storage error encoding function to produce a test set of error coded data slices (e.g., tslice 1-n). For example, the encoder 77 encodes the recovered data segment 192 to produce a set of recovered slices (e.g., rslice 1-n) and the error injection module 189 alters the set of recovered slices in accordance with the error pattern 191 to produce the test set of error coded data slices.

With the test set of error coded data slices produced, the integrity verification module 190 of the second device compares error coded data slices of the test set of error coded data slices (e.g., tslice 1-n) with corresponding error coded data slices of the at least a threshold number of error coded data slices (e.g., rxeslice 1-n). When, on a slice by slice basis, the error coded data slices of the test set of error coded data slices substantially match the corresponding error coded data slices of the at least a threshold number of error coded data slices, the integrity verification module 190 produces integrity status 193 to indicate that the recovered data segment 192 has not been corrupted.

Alternatively, the integrity verification module 190 produces the integrity status 193 to indicate that the recovered data segment 192 has been corrupted when the error coded data slices of the test set of error coded data slices does not match the corresponding error coded data slices of the at least a threshold number of error coded data slices. The system may function to process another data segment, where the data segment and the other data segment are portions of the data object. The method to process the other data segment is discussed in greater detail with reference to FIG. 9K.

FIGS. 9B-C are examples of processing a set of encoded data slices to detect corruption of one or more encoded data slices. The examples include generating a set of 5 encoded data slices when a pillar width is 5 and a decode threshold number is 3. A data segment is encoded using a dispersed storage error coding function to produce the set of encoded data slices (e.g., slices 1-5). The set of encoded data slices are encoded using an altered dispersed storage error coding function in accordance with an intentional error pattern to produce a set of error coded data slices (e.g., eslice 1-5) that includes intentional error blocks. For instance, a first data block of slice 1 is encoded to produce a first intentional error block of eslice 1 (e.g., F changed to E) and a fourth data block of slice 3 is encoded to produce a fourth intentional error block of eslice 3 (e.g., changed 0 to 1).

In particular, FIG. 9B illustrates an example when corruption has not occurred. For example, the set of error coded slices (e.g., eslice 1-5) are retrieved to produce a set of received slices (e.g., rxeslice 1-5). The set of received slices is decoded in accordance with the intentional error pattern to produce a recovered data segment. For instance, the first intentional error block of eslice 1 and the fourth intentional error block of eslice 3 are not utilized in the decoding. The recovered data segment is encoded using the dispersed storage error coding function to produce a set of recovered slices (e.g., rslice 1-5). The set of recovered slices are encoded using the altered dispersed storage error coding function in accordance with the intentional error pattern to produce a test set of error coded data slices (e.g., tslice 1-5). The set of received slices (e.g., rxeslice 1-5) are compared to the test set of error coded slices (e.g., tslice 1-5) on a slice by slice basis. The recovered data is verified to be without corruption when the set of received slices matches the test set of error coded slices.

FIG. 9C illustrates an example when corruption has occurred. For example, the set of error coded slices (e.g., eslice 1-5) are retrieved to produce the set of received slices (e.g., rxeslice 1-5) where one or more slices includes slice tampering. The set of received slices is decoded in accordance with the intentional error pattern to produce the recovered data segment. For instance, the first intentional error block of eslice 1 and the fourth intentional error block of eslice 3 are not utilized in the decoding. The recovered data segment is encoded using the dispersed storage error coding function to produce the set of recovered slices (e.g., rslice 1-5). The set of recovered slices are encoded using the altered dispersed storage error coding function in accordance with the intentional error pattern to produce the test set of error coded data slices (e.g., tslice 1-5). The set of received slices (e.g., rxeslice 1-5) are compared to the test set of error coded slices (e.g., tslice 1-5) on a slice by slice basis. The recovered data is not verified and an indication that corruption has occurred is generated when the set of received slices does not match the test set of error coded slices.

FIG. 9D is a diagram illustrating an example of encoding a data segment 90 into a plurality of data blocks D1-Dn. The set of data blocks provides a representation of the data segment 90. For example, the data segment is divided into n equal portions to form data blocks D1-Dn. As another example, the data segment is divided into as many portions as required when a fixed data portion size is utilized.

FIG. 9E is a diagram illustrating an example of matrix multiplication of an encoding matrix (E) and a data matrix (D) to produce a coded matrix (C). In an example of a Reed Solomon encoding function, the matrix multiplication is utilized to encode a data segment to produce a set of data blocks as a representation of the data segment. The Reed Solomon encoding function is associated with an error coding number and a decode threshold number. As a specific example, the encoding matrix includes the error coding number of Y rows and the decode threshold number of X columns. Accordingly, the encoding matrix includes Y rows of X coefficients. The set of data blocks of the data segment is arranged into the data matrix having X rows of Z number of data words (e.g., X*Z=number of data blocks). The data matrix is matrix multiplied by the encoding matrix to produce the coded matrix, which includes Y rows of Z number of encoded values.

The encoding function may utilize a variety of encoding approaches to facilitate dispersed storage error encoding of data. The encoding function includes, but is not limited to, at least one of the Reed Solomon encoding, an information dispersal algorithm, on-line codes, forward error correction, erasure codes, convolution encoding, Trellis encoding, Golay, Multidimensional parity, Hamming, Bose Ray Chauduri Hocquenghem (BCH), and/or Cauchy-Reed-Solomon.

FIGS. 9F-H are diagrams illustrating further examples of matrix multiplication of an encoding matrix (E) and a data matrix (D) using an altered dispersed storage error encoding function to produce a coded matrix (C), where a set of error coded data slices are produced from the coded matrix. In an example of operation of using the altered dispersed storage error coding function utilizing a Reed Solomon encoding function, a data segment is converted into data blocks (e.g., D1-D12) of a portion of the data matrix. Next, the encoding matrix is matrix multiplied by the data matrix to produce the coded matrix, where the coded matrix includes encoded blocks. As a specific example, the altered dispersed storage error encoding utilizes an error coding number of five and a decode threshold number of three. The encoding matrix (E) includes five rows of three coefficients (e.g., a-o). The data segment is divided into data blocks D1-12 which are arranged into the portion of the data matrix (D) having 3 rows of 4 data blocks when the number of data blocks is 12. The number of rows of the data matrix matches the number of columns of the encoding matrix (e.g., the decode threshold number). The number of columns of the data matrix increases as the number of data blocks of the data segment increases. The data matrix is matrix multiplied by the encoding matrix to produce the coded matrix, which includes 5 rows of 4 encoded blocks (e.g., X11-X14, X21-X24, X31-X34, X41-X44, and X51-X54). The number of rows of the coded matrix matches the number of rows of the encoding matrix (e.g., the error coding number). For instance, $X11=aD1+bD5+cD9$; $X12=aD2+bD6+cD10$; $X21=dD1+eD5+fD9$; $X31=gD1+hD5+iD9$; $X34=gD4+hD8+iD12$; and $X54=mD4+nD8+oD12$.

One or more encoded blocks from each row of the coded matrix are selected to form a corresponding error coded data slice of the set of error coded data slices. Accordingly, an error coding number of error coded data slices are produced from the coded matrix. For example, coded values X11-X14 are selected to produce an error coded data slice 1, coded values X21-X24 are selected to produce an error coded data slice 2, coded values X31-X34 are selected to produce an error coded data slice 3, coded values X41-X44 are selected to produce an error coded data slice 4, and coded values X51-X54 are selected to produce an error coded data slice 5. The data matrix (e.g., the data segment) may be recovered (e.g., to produce a recovered data segment) when any decode threshold number of error coded data slices are available of the set of error coded data slices. Alternatively, the recovered data segment may be reproduced when a decode threshold number of encoded blocks for each column of the coded matrix are available.

FIGS. 9F-G illustrates an example of the altering of the dispersed storage error encoding function where intentional error blocks are inserted into the coded matrix in accordance with an intentional error pattern and the encoded blocks and the intentional error blocks are arranged into the set of error coded data slices. For example, FIG. 9F illustrates an example where encoded block X14 is replaced with intentional error block X14, encoded block X23 is replaced with intentional error block X23, encoded block X32 is replaced with intentional error block X32, and encoded block X41 is replaced with intentional error block X41 when the intentional error pattern indicates to replace one encoded block in each column where no two rows include more than one intentional error block.

As another example, FIG. 9G illustrates an example where encoded block X21 is replaced with intentional error block X21, encoded block X22 is replaced with intentional error block X22, encoded block X23 is replaced with intentional error block X23, and encoded block X24 is replaced with intentional error block X24 when the intentional error pattern indicates to replace one encoded block in each column where no more than one common row includes one intentional error block. The recovered data segment may be produced when three of at most four available encoded blocks are available from the four columns of the coded matrix.

Each intentional error block is determined by at least one of performing a deterministic function on one or more of the encoded blocks, utilizing a constant, and performing a deterministic function on a dispersed storage network address associated with the data segment. The deterministic function includes at least one of a hashing function, a hash-based message authentication code, a mask generating function (MGF), a sponge function, and inversion function, a logical function, and an arithmetic function. As a specific example, intentional error block X14 of FIG. 9F is produced by applying the mask generating function to encoded blocks of a common column of the coded matrix with the encoded block X14 (e.g., X14=MGF(X24,X34,X44,X54). As another specific example, intentional error block X24 of FIG. 9G is produced by applying an exclusive OR logical function to encoded blocks of a common column of the coded matrix with the encoded block X24 (e.g., X24=X14 XOR X34 XOR X44 XOR X54).

FIG. 9H illustrates another example of the altering of the dispersed storage error encoding function where an intentional error data matrix is generated in accordance with the intentional error pattern. For example, a decode threshold number of error data blocks (e.g., E1-3) are generated to form a single column as the intentional error data matrix of the data matrix when the intentional error pattern indicates to generate a new column of the data matrix. Each error data block is generated by at least one of performing a deterministic function on one or more of the set of data blocks, utilizing a data constant, and performing the deterministic function on the dispersed storage network address associated with the data segment. As a specific example, error data block E1 is generated by performing the hashing function on data blocks D1-D4. As another specific example, error data block E2 is generated by performing the exclusive OR function on data blocks D5-D8. As yet another specific example, error data block E3 is generated by performing the mask generating function on data blocks D1-D12.

With the intentional error data matrix generated in accordance with the intentional error pattern, the intentional error data matrix is matrix multiplied by the encoding matrix to generate an intentional error coded matrix (e.g., a new column) of the coded matrix. For example, X15=aE1+bE2+cE3; X25=dE1+eE2+fE3; etc. Next, the encoded blocks and intentional error blocks are arranged into the set of error coded data slices (e.g., error coded data slice 1=X11, X12, X13, X14, X15). The recovered data segment may be produced when three of five available encoded blocks are available for the first four columns of the coded matrix. As such, the altering approach of the intentional error pattern associated with FIG. 9H may provide improved data recovery reliability performance as compared to the altering approaches and intentional error patterns associated with FIGS. 9F-G.

FIG. 9I is a diagram illustrating an example of matrix multiplication of an inverse square decoding matrix and a reduced recovered coded matrix to produce a recovered data matrix. The reduced recovered coded matrix corresponds to a received portion of a coded matrix, where a set of received error coded data slices includes the reduced recovered coded matrix. Each column of Z columns of the reduced recovered coded matrix includes a decode threshold number of received encoded blocks (e.g., a decode threshold number of X rows) of the corresponding coded matrix. The inverse square decoding matrix is generated by selecting rows of a corresponding encoding matrix (e.g., that was utilized to produce the coded matrix) to produce a square decoding matrix, where the selected rows correspond to the decode threshold number of rows of the reduced recovered coded matrix. As such, both rows and columns of the square decoding matrix include a decode threshold number. Next, the square decoding matrix is inverted to produce the inverse square decoding matrix.

In an example of a Reed Solomon decoding function, the matrix multiplication is utilized to decode the received encoded blocks to produce a recovered data segment. As a specific example, the inverse square decoding matrix is matrix multiplied by the reduced recovered coded matrix to produce the recovered data matrix, which includes X rows of Z number of data blocks.

FIG. 9J is a diagram illustrating an example of matrix multiplication of a group of inverse square decoding matrices and a group of reduced recovered coded matrices to produce a group of recovered data matrices in accordance with an intentional error pattern and an altered dispersed storage error encoding function. A received coded matrix 195 of received error coded slices (e.g., rxeslice 1-5 as discussed with reference to FIGS. 9B, C, F) is reduced to produce Z number of the reduced recovered coded matrices based on the intentional error pattern. For example, a first column of the received coded matrix 195 includes encoded blocks X11, X21, X31, X51, and intentional error block X41. Encoded blocks of a decode threshold number of the error coded data slices are arranged into a first reduced recovered coded matrix (e.g., X11, X21, X31) by removing the intentional error blocks (e.g., X41) producing adjusted error coded data slices that includes just one encoded block (e.g., part of one column of the received coded matrix 195). A corresponding first inverse square decoding matrix is generated to include an inverse of a square decoding matrix that includes rows of an associated encoding matrix where the rows correspond to selected rows of the encoded blocks (e.g., rows 1-3). Next, the first inverse square decoding matrix is matrix multiplied by the first reduced recovered coded matrix to produce a first recovered data matrix (e.g., D1, D5, D9). The process is repeated for each other column of the received coded matrix 195 to produce corresponding recovered data matrices of a recovered data matrix. Data blocks of the recovered data matrix are aggregated to produce a recovered data segment. A similar process may be utilized to decode another recovered data matrix that corresponds to the coded matrix as discussed with reference to FIG. 9H. A decode threshold number of received error coded data slices are decoded to reproduce the data matrix that includes the recovered data segment.

FIG. 9K is a flowchart illustrating an example of detecting data corruption. The method begins at step 194 where a first device of a dispersed storage network (DSN) alters a dispersed storage error encoding function to include an intentional error pattern to produce an altered dispersed storage error encoding function. As an example, the first device converts a data segment into a data matrix and generates a coded matrix from the data matrix and an encoding matrix, where the coded matrix includes encoded blocks (e.g., matrix multiplication). Next, the first device inserts intentional error blocks into the coded matrix in accordance with the intentional error pattern and arranges the encoded blocks and the intentional error blocks into a set of error coded data slices. As another example of altering the dispersed storage error encoding function, the first device generates an intentional error data matrix in accordance with the intentional error pattern and generates an intentional error coded matrix from the intentional error data matrix and the encoding matrix, where the intentional error coded matrix includes intentional error blocks (e.g., matrix modification). Next, the first device arranges the encoded blocks and the intentional error blocks into the set of error coded data slices.

The method continues at step 196 where the first device encodes the data segment using the altered dispersed storage error encoding function to produce the set of error coded data slices. As a result of the intentional error pattern, one or more error coded data slices of the set of error coded data slices is intentionally altered to include an error. The method continues at step 198 where the first device transmits the set of error coded data slices to storage units of the DSN or to a second device of the DSN. The method continues at step 200 where the second device retrieves at least a threshold number of error coded data slices of the set of error coded data slices from the storage units of the DSN when the set of error coded data slices are stored in the storage units. The second device may be the same as the first device. Alternatively, the second device receives the at least a threshold number of error coded data slices of the set of error coded data slices from the first device when the first device transmits the set of error coded data slices to the second device.

The method continues at step 202 where the second device identifies, based on the intentional error pattern, error coded data slices of the at least a threshold number of error coded data slices that were intentionally altered to include the error to produce identified error coded data slices. The method continues at step 204 where the second device modifies the identified error coded data slices to extract the intentionally included error to produce adjusted error coded data slices. As a specific example, the second device arranges the at least a threshold number of error coded data slices into a recovered coded matrix of the encoded blocks and intentional error blocks and removes the intentional error blocks from the recovered coded matrix to produce the adjusted error coded data slices and remaining ones of the at least a threshold number of error coded data slices.

The method continues at step 206 where the second device decodes the adjusted error coded data slices and remaining ones of the at least a threshold number of error coded data slices using the dispersed storage error encoding function to produce a recovered data segment. The method continues at step 208 where the second device encodes the recovered data segment using the altered dispersed storage error encoding function to produce a test set of error coded data slices. The method continues at step 210 where the second device compares error coded data slices of the test set of error coded data slices with corresponding error coded data slices of the at least a threshold number of error coded data slices. When, on a slice by slice basis, the error coded data slices of the test set of error coded data slices substantially match the corresponding error coded data slices of the at least a threshold number of error coded data slices, the method continues at step 212 where the second device indicates that the recovered data segment has not been corrupted.

The system may function to process another data segment, where the data segment and the other data segment are portions of the data object. For example, the system functions to repeat the retrieving, the identifying, the modifying, the decoding, the encoding, the comparing, and the indicating for the other data segment, wherein the data segment and the other data segment are portions of a data object. As a specific example of processing of the other data segment, the second device retrieves at least another threshold number of error coded data slices of another set of error coded data slices from the storage units. The first device alters the dispersed storage error encoding function to include a second intentional error pattern to produce a second altered dispersed storage error encoding function. The first device encodes the other data segment using the second altered dispersed storage error encoding function to produce the other set of error coded data slices. As a result of the second intentional error pattern, one or more error coded data slices of the other set of error coded data slices is intentionally altered to include an error.

Having retrieved the at least another threshold number of error coded data slices of the other set of error coded data slices, the second device identifies, based on the second intentional error pattern, error coded data slices of the at least a threshold number of error coded data slices that were intentionally altered to include the error to produce second identified error coded data slices. The second device modifies the second identified error coded data slices to extract the intentionally included error to produce second adjusted error coded data slices. Next, the second device decodes the second adjusted error coded data slices and remaining ones of the at least a threshold number of error coded data slices using the dispersed storage error encoding function to produce a second recovered data segment.

Having recovered the second recovered data segment, the second device encodes the second recovered data segment using the second altered dispersed storage error encoding function to produce a second test set of error coded data slices. The second device compares error coded data slices of the second test set of error coded data slices with corresponding error coded data slices of the at least another threshold number of error coded data slices. When, on a slice by slice basis, the error coded data slices of the second test set of error coded data slices substantially match the corresponding error coded data slices of the at least another threshold number of error coded data slices, the second device indicates that the second recovered data segment has not been corrupted.

FIG. 10A is a flowchart illustrating an example of storing encoded data slices. The method begins with step 216 where a processing module (e.g., a dispersed storage (DS) processing unit) receives data to store. The method continues at step 218 where the processing module determines data attributes of the data based on one or more of a query, a test, data inspection, a message, a data identifier, and a lookup. The data attributes may include one or more of data size, expected frequency of reads, expected frequency of updates, a fixed size, and if the data is allowed to be updatable. The method continues at step 220 where the processing module dispersed storage error encodes the data to produce encoded data slices.

The method continues at step 222 where the processing module determines a storage method based on one or more of the data attributes and weighting information from a storage method table. Such a storage method table is discussed in greater detail with reference to FIG. 10B. For example, the processing module utilizes the data attributes to determine a weighting and determines the storage method based on the weighting. For instance, the processing module determines that two of the data attributes favor a block storage method over the other storage methods. As another instance, the processing module determines that three of the data attributes favor a B-Tree storage method over the other storage methods.

The method continues at step 224 where the processing module determines whether to utilize the B-tree storage method based on the storage method. The method branches to step 228 when the processing module determines not to utilize the B-tree storage method. The method continues to step 226 when the processing module determines utilize the B-tree storage method. The method continues at step 226 where the processing module stores the encoded data slices utilizing the B-tree storage method.

The method continues at step 228 where the processing module determines whether to utilize the block storage method based on the storage method. The method branches to step 232 when the processing module determines not to utilize the block storage method. The method continues to step 230 when the processing module determines to utilize the block storage method. The method continues at step 230 where the processing module stores the encoded data slices utilizing the block storage method.

The method continues at step 232 where the processing module determines whether to utilize the file storage method based on the storage method. The method branches to step 236 when the processing module determines not to utilize the file storage method. The method continues to step 234 when the processing module determines to utilize the file storage method. The method continues at step 234 where the processing module stores the encoded data slices utilizing the file storage method.

The method continues at step 236 where the processing module determines whether to utilize the compacting storage method based on the storage method. The method branches to step 240 when the processing module determines to not utilize the compacting storage method. The method continues to step 238 when the processing module determines to utilize the compact in storage method. The method continues at step 238 where the processing module stores the encoded data slices utilizing the compacting storage method.

The method continues at step 240 where the processing module stores the encoded data slices utilizing another storage method when the processing module determines to not utilize the compacting storage method. Such another storage method includes any other storage method outside of those discussed previously.

FIG. 10B is an example table illustrating a storage method table 242. The storage method table 242 includes an attribute field 244 and a weighting field 246. The attribute field 244 may include one or more attribute entries of data to be stored. Such attributes may include one or more of a large size indicator, a small size indicator, a consistent size indicator (e.g., few subsequent modifications expected), a fixed size indicator (e.g., no subsequent modifications expected), a frequent updates indicator (e.g., when the data is expected to be updated often), and a non-sequential names indicator (e.g., when a naming approach is expected to be random).

The weighting field 246 includes a plurality of storage method type fields. Such storage method type fields include one or more of a B-tree field 248, a block field 250, a file field 252, and a compact field 254 (e.g., for compacting storage). The storage method type fields include one or more compatibility indicator entries. The compatibility indicators indicate a level of compatibility between an attribute entry of the attribute field 244 and a storage method type. Each compatibility indicator indicates a level of compatibility and may be represented by a "0" for indifference, a "+" for a desired positive compatibility, and a "−" for a undesired negative compatibility. For example, file storage and compacting storage methods are more compatible with larger file sizes as indicated by "+" entries in the file field 252 and the compact field 254 for a large size entry of attribute field 244. As another example, the file storage method is less compatible with a small size file while the compacting storage method is more compatible with a small size file as indicated by entries associated with a small size entry of the attribute field 244.

The level of compatibility indicators may be utilized in aggregate to select a storage method to store data by choosing a storage method that is most compatible with data attributes of the data. For example, the block storage method is selected when data attributes include small size, fixed size, and frequent updates. As another example, the compacting storage method is selected when data attributes include large size and consistent size.

FIG. 11A is another schematic block diagram of another embodiment of a computing system. The system includes a user device 12, a dispersed storage (DS) processing unit A, a DS processing unit B, and a dispersed storage network (DSN) memory 22. In an example of operation, the user device 12 sends a data object 260 to DS processing unit A and DS processing unit B for storage in the DSN memory 22. DS processing unit A selects a first portion of the data object 260 and dispersed storage error encodes the first portion of the data object 260 to produce a slice set A. DS processing unit B selects a second portion of the data object 260 and dispersed storage error encodes the second portion of the data object to produce a slice set B. In an instance, the first portion of the data object is a first half of the data object 260 and the second portion of the data object 260 is a second half of the data object. As another instance, the first portion of the data object 260 includes odd-numbered data segments and the second portion of the data object 260 includes even-numbered data segments. The DS processing unit A and the DS processing unit B may utilize dispersed storage error encoding storage parameters that are substantially the same when dispersed storage error encoding portions of the data object 260 to produce slice sets. In the example of operation continued, DS processing unit A sends slice set A to the DSN memory 22 for storage and DS processing unit B sends slice set B to the DSN memory 22 for storage. The method of operation of DS processing units A and B is discussed in greater detail with reference to FIG. 11B.

FIG. 11B is a flowchart illustrating an example of dispersed storage error encoding data. The method begins with step 262 where a processing module (e.g., a dispersed storage (DS) processing unit) receives data to store. The data may include at least one of a data file, an audio file, a video file, streaming data, multimedia, software, a data block, a data object, and one or more data segments. The method continues at step 264 where the processing module determines a unique data portion (e.g., a portion of the data to encode associated with the present processing module). The determination may be based on one or more of the data, a data identifier, a performance indicator, a DS processing unit identifier, a list of available dispersed storage (DS) processing units, assignments of DS processing units, a lookup, and a message. For example, the processing module determines the data portion to be odd-numbered data segments based on a lookup of assignments of DS processing unit and a DS processing unit identifier. The method continues at step 266 where the processing module dispersed storage error encodes the unique data portion to produce a plurality of sets of encoded data slices. The method continues at step 268 where the processing module sends the plurality of sets of encoded data slices to a dispersed storage network (DSN) memory for storage therein.

FIG. 12A is a flowchart illustrating an example of storing data, which includes similar steps to FIG. 11B. The method begins with step 262 of FIG. 11B where a processing module receives data to store. The method continues at step 270 where the processing module dispersed storage error encodes the data to produce a plurality of sets of encoded data slices. The method continues at step 272 where the processing module determines dispersed storage (DS) units based on one or more of an available DS unit list, a pillar list, preferred DS units, a virtual dispersed storage network (DSN) address to physical location table lookup, a query, and a message. The method continues at step 274 where the processing module determines DS unit performance information for the DS units. The performance information may include information of one or more of latency, bandwidth, speed, availability, and reliability. The determination may be based on one or more of the DS units, a lookup, a query, a history record, and a message.

The method continues at step 276 where the processing module selects a DS unit subset of the DS units based on the DS unit performance information. The DS unit subset may have at least a write threshold number of DS units. For example, the processing module selects DS units of the subset that have a fastest storage response time. As another example, the processing module selects DS units of the subset based on matching a bandwidth of data being received to a bandwidth performance of selected DS units.

The method continues at step 278 where the processing module sends a set of encoded data slices to the subset of the DS units. For example, the processing module places the encoded data slices in a transmit queue intended to subsequently be transmitted to the DS units. The method continues at step 280 where the processing module determines whether the processing module has received a write threshold number of storage confirmations. The method branches to step 284 when the processing module determines that a write threshold number of storage confirmations have been received for the current set. The method continues to step 282 when the processing module determines that a write threshold number of storage confirmations have not been received for the current set. The method continues at step 282 where the processing module updates the DS unit performance information. The updating may include noting which DS units performed the poorest (e.g., which did not confirm a write slice). The method repeats back to step 276 to select a new DS unit subset.

The method continues at step 284 where the processing module determines if all sets have been processed when a write threshold number of storage confirmations have been received. The method repeats back to step 278 when the processing module determines that all sets have not been processed. The method ends at step 286 when the processing module determines that all sets have been processed.

FIG. 12B is another flowchart illustrating another example of storing data. The method begins with step 288 where a processing module (e.g., of a dispersed storage (DS) processing unit) determines whether a data ingest rate is greater than a corresponding slice output rate. For example, the processing module determines whether slices being encoded from a video stream being ingested can keep up with the video stream input based on comparing an output rate to an input rate. The method branches to step 292 when the processing module determines that the data ingest rate is greater than the corresponding slice output rate. The method continues to step 290 when the processing module determines that the data ingest rate is not greater than the corresponding slice output rate. The method continues at step 290 where the processing module keeps ingesting data and storing encoded data slices.

The method continues at step 292 where the processing module determines sequencing requirements when the processing module determines that the data ingest rate is greater than the corresponding slice output rate. The sequencing requirements may include indicators for one or more of never stop ingesting, okay to stop ingesting, okay to rebuild later, not okay to rebuild later, minimum write speed, quality of service level, a data size indicator, and a minimum throughput level. The determination may be based on one or more of a data store request message, a lookup, a user identity, a data identifier, a message, and a command.

The method continues at step 294 where the processing module determines an approach to avoid sequencing errors. The determination may be based on one or more of dispersed storage (DS) units utilized to store the encoded data slices, performance of the DS units, the sequencing requirements, attributes of the approaches to avoid sequencing errors, comparing the sequencing requirements to attributes of approaches to avoid the sequencing errors and comparing the sequencing requirements to the performance of the DS units. For example, the processing module determines the approach to avoid sequencing errors to include holding the input when the sequencing requirements includes an indicator that indicates that it is okay to stop ingesting. As another example, the processing module determines the approach to avoid sequencing errors to include caching the input when the sequencing requirements includes an indicator that indicates that it is not okay to stop ingesting and caching memory is available to store the data based on the data size indicator. As yet another example, the processing module determines the approach to avoid sequencing errors to include discarding encoded data slices when the sequencing requirements includes an indicator that indicates a quality of service level that is compatible with discarding at least some of the encoded data slices.

The method continues at step 296 where the processing module determines whether to utilize the hold approach to avoid sequencing errors based on the determined approach. The method branches to step 300 when the processing module determines not to utilize the hold approach. The method continues to step 298 when the processing module determines to utilize the hold approach. The method continues at step 298 where the processing module pauses ingesting data.

The method continues at step 300 where the processing module determines whether to utilize the caching approach to avoid sequencing errors based on the determined approach. The method branches to step 304 when the processing module determines not to utilize the caching approach. The method continues to step 302 when the processing module determines to utilize the caching approach. The method continues at step 302 where the processing module temporarily caches encoded data slices corresponding to DS units identified as slowest DS units.

The method continues at step 304 where the processing module determines whether to utilize the discarding approach to avoid sequencing errors based on the determined approach. The method branches to step 308 when the processing module determines not to utilize the discarding approach. The method continues to step 306 when the processing module determines to utilize the discarding approach. The method continues at step 306 where the processing module discards encoded data slices corresponding to slowest DS units. The processing module may subsequently invoke a rebuilding process if at least a write threshold number of slices are stored. In addition, the processing module may stop throttling the writing of slices to faster DS units.

The method continues at step 308 where the processing module utilizes another approach when the processing module determines not to utilize the discarding approach. The another approach may include one or more of doing nothing, adding resources, selecting different DS units, utilizing a different network connection to a DS unit, changing error encoding dispersal storage function parameters to reduce output bandwidth, and issuing an error message.

FIG. 13A is a flowchart illustrating an example of producing encoded data slices, which include similar steps to FIG. 11B. The method begins with step 262 of FIG. 11B where a processing module receives data for storage. The method continues with step 310 where the processing module determines available central processing units (CPUs). The determination may be based on one or more of a query, a list, a schedule, a test, and a message. The method continues at step 312 where the processing module determines error coding dispersal storage function parameters based on one or more of available CPUs, lookup, a list, and a message. For example, the processing module determines a read threshold to be just less than the number of available CPUs.

The method continues at step 314 where the processing module determines CPU assignments based on available CPUs and the error coding dispersal storage function parameters. The determination may be based on one or more of available CPUs, the error coding dispersal storage function parameters, optimizing for lowest estimated time of encoding, encoding just a slice, encoding just a portion of a slice, a predetermination, a lookup, and a message. For example, the processing module assigns faster CPUs to encode a read threshold number of slices. As another example, the processing module assigns fast CPUs first to encode slices to be sent to faster dispersed storage (DS) units. Slice portion tasks are discussed in greater detail with reference to FIG. 13B.

The method continues at step 316 where the processing module executes the CPU assignments to produce CPU outputs. For example, CPU 1 encodes a first portion of slice 1, CPU 2 encodes a second portion of slice 1, and CPU 3 encodes a third portion of slice 1. A system performance improvement may be realized when the three CPUs encode the three slice portions substantially in parallel. A CPU task map illustrating the execution of CPU assignments is discussed in greater detail with reference to FIG. 13C.

The method continues at step 318 where the processing module aggregates CPU outputs to produce encoded data slices. For example, the processing module aggregates the first portion, the second portion, and the third portion of slice 1 to produce slice 1. The method continues at step 320 where the processing module determines transmission prioritization based on CPU assignments. For example, the processing module determines to prioritize transmission of slice 1 when the CPU assignments are aligned with producing slice 1 first. As another example, the processing module determines to prioritize the transmission of a read threshold number of slices to more quickly enable subsequent retrieval of the data. The method continues at step 322 where the processing module sends the encoded data slices in accordance with the transmission prioritization to a dispersed storage network (DSN) memory for storage therein.

FIG. 13B is an algorithm diagram illustrating an example of encoding data. Such encoding may be utilized to dispersed storage error encode data to produce a set of encoded data slices. The encoding of each slice of the set includes a plurality of intermediate steps. For example, a 5 by 3 generator matrix 324 is multiplied times a 3 by 1 data matrix 326 to produce a 5 by 1 slice matrix 328 of encoded data slices 1-5. The example corresponds to a dispersed storage network utilizing a pillar slicing width of five and a decode threshold of 3. Note that each slice may be calculated by adding three products of an entry of the generator matrix times an entry of the data matrix. For example, slice 1 is encoded as ax+by +cz. A system performance improvement may be realized by subdividing the execution of the encoding of slices between at least three CPUs for each slice.

FIG. 13C is a central processing unit (CPU) task map illustrating an example of determining CPU assignments. For example, a CPU load to calculate a slice 1 is divided amongst three CPUs. In an instance, CPU 1 encodes the "ax" product, CPU 2 encodes the "by" product, and CPU 3 encodes the "cz" product. Any of the CPUs may subsequently aggregate the three products to produce slice 1. Note that CPUs 1-3 are also assigned to subsequently encode the "jx", "ky", "lz", "mx", "ny", and "oz" products. A different CPU may be assigned to encode a different product of slices 1-3 to enable the encoding of a threshold number of slices (e.g., three) as quick as possible. The CPUs are assigned to create and send slices 4 and 5 once the threshold number of slices (e.g., slices 1-3) are encoded and sent.

FIG. 14 is another flowchart illustrating another example of storing data, which include similar steps to FIG. 11B. The method begins with step 262 of FIG. 11B where a processing module receives data for storage. The method continues at step 330 where the processing module determines a data portion of the data. The data portion may include one or more data segments as a function of a size of the data. The determination may be based on one or more of a size indicator of the data, a lookup, a predetermination, a message, an estimated time to store, and a time threshold. The method continues at step 332 where the processing module dispersed storage error encodes the data portion to produce a plurality of sets of encoded data slices.

The method continues at step 334 where the processing module sends the plurality of sets of encoded data slices to a dispersed storage network (DSN) memory for storage therein utilizing a unique transaction number corresponding to the data portion (e.g., as compared to other plurality of sets of encoded data slices for other data portions). The method continues at step 336 where the processing module determines whether a write threshold number of write request response messages have been received within a time period. The method branches to step 340 when the processing module determines that the write threshold number of write request response messages have been received within the time period. The method continues to step 338 when the processing module determines that the write threshold number of write request response messages have not been received within the time period. The method continues at step 338 where the processing module determines which data portion to do over based on a last committed data portion. For example, the processing module determines to do over a data portion that follows a last committed data portion. The method repeats back to step 332 where the processing module dispersed storage error encodes the data portion to do over.

The method continues at step 340 where the processing module sends a commit transaction request message to the DSN memory that includes the unique transaction number when the processing module determines that the write threshold number of write request response messages have been received within the time period. The method continues at step 342 where the processing module updates a directory corresponding to the data portion. The updating indicates that the data portion is committed. The process can be picked up again later in the next data portion if the process is interrupted.

The method continues at step 344 where the processing module determines whether there are more data portions of the data to store. The determination may be based on comparing a list of data portions to a list of data portion stored so far. The method repeats back to step 330 when the processing module determines that there are more data portions of the data to store. The method ends at step 346 when the processing module determines that there are no more data portions of the data to store.

FIG. 15A is a flowchart illustrating an example of producing integrity check information. The method begins with step 348 where a processing module (e.g., of a dispersed storage (DS) processing unit) generates an integrity check value for each encoded data slice of a set of encoded data slices to produce a set of integrity check values (e.g., a set of encoded data slices corresponding to the data segment). The generating the integrity check value includes applying an integrity check function on the encoded data slice to generate the integrity check value, wherein the integrity check function includes at least one of a hashing function, a cyclic redundancy check function, a parity check function, and a mask generating function (MGF).

The method continues at step 350 where the processing module encodes the set of integrity check values to produce encoded integrity check values. The encoding includes at least one of encrypting the set of integrity check values to produce encrypted integrity check information and dispersed storage error encoding the set of integrity check values or the encrypted integrity check information to produce a set of encoded integrity check slices, wherein the encoded integrity check values includes the set of encoded integrity check slices or the encrypted integrity check information. As an alternative to dispersed storage error encoding, the processing module may apply a Shamir sharing function to a set of integrity check values or the encrypted integrity check information to produce a set of encoded integrity check slices. The encrypting the set of integrity check values includes at least one of encrypting the set of integrity check values utilizing an all or nothing (AONT) transformation (e.g., where a random key is utilized for encrypting and is packed with the encrypted integrity check information), encrypting the set of integrity check values utilizing a public-key, encrypting the set of integrity check values utilizing a private key, and signing the set of integrity check values utilizing the private-key.

The method continues at step 352 where the processing module sends the encoded integrity check values for storage in a memory system. The sending of the encoded integrity check values may include sending an encoded data slice to a DS unit of a set of DS units for storage therein and sending one of the set of encoded integrity check slices (e.g., of a same pillar number as the encoded data slice) to the DS unit for storage therein for the each encoded data slice of the set of encoded data slices. Alternatively, the sending of the encoded integrity check values may include sending the set of encoded data slices to a first set of DS units and sending the set of encoded integrity check slices to a second set of DS units (e.g., the first and second sets of DS units do not have to be mutually exclusive). Alternatively, or in addition to, the processing module may store the encoded integrity check values in a local memory (e.g., a distributed local memory, a DS managing unit)

FIG. 15B is a flowchart illustrating an example of utilizing integrity check information. The method begins with step 354 where a processing module (e.g., of a dispersed storage (DS) processing unit) obtains at least a decode threshold number of encoded data slices of a set of encoded data slices. The obtaining includes at least one of receiving the at least the decode threshold number of encoded data slices and retrieving the at least the decode threshold number of encoded data slices. The method continues at step 356 where the processing module obtains encoded integrity check values. The obtaining includes at least one of receiving the encoded integrity check values and retrieving the encoded integrity check values. For example, the processing module retrieves a decode threshold number of encoded integrity check values from a dispersed storage network (DSN) memory.

The method continues at step 358 where the processing module decodes the encoded integrity check values to produce a set of stored integrity check values, wherein each integrity check value of the set of stored integrity check values is associated with a corresponding encoded data slice of the set of encoded data slices. The decoding the encoded integrity check values includes at least one of decrypting the encoded integrity check values to produce decrypted integrity check values and dispersed storage error decoding the encoded integrity check values or the decrypted integrity check values to produce dispersed storage error decoded integrity check values, wherein the set of stored integrity check values includes the decrypted integrity check values or the dispersed storage error decoded integrity check values. As an alternative to dispersed storage error decoding, the processing module may apply a Shamir sharing function to the encoded integrity check values or the decrypted integrity check values to produce dispersed storage error decoded integrity check values.

The decrypting the encrypted integrity check values includes at least one of decrypting the integrity check values utilizing an all or nothing (AONT) transformation (e.g., a random key is unpacked from the integrity check information and utilized for the decrypting), decrypting the integrity check values utilizing a public-key, decrypting the integrity check values utilizing a private key, and verifying a signature of the integrity check values utilizing the private key. Alternatively, at step 358, the processing module dispersed storage error decodes the encoded integrity check values to produce the encrypted integrity check values and decrypts the encrypted integrity check values to produce the set of stored integrity check values.

The method continues at step 360 where the processing module calculates an integrity check value for each of the at least the decode threshold number of encoded data slices to produce a set of calculated integrity check values. The calculating the integrity check value for each of the at least the decode threshold number of encoded data slices includes applying an integrity check function on the encoded data slice to generate the integrity check value, wherein the integrity check function includes at least one of a hashing function, a cyclic redundancy check function, a parity check function, and a mask generating function (MGF).

The method continues at step 362 where the processing module compares a corresponding integrity check value of the set of stored integrity check values with a corresponding integrity check value of the set of calculated integrity check values for each of the at least the decode threshold number of encoded data slices. The method branches to step 366 when the processing module determines that the comparing of the corresponding integrity check values for each of the at least the decode threshold number of encoded data slices is favorable. The method continues to step 364 when the processing module determines that the comparing of the corresponding integrity check values for each of the at least the decode threshold number of encoded data slices is unfavorable. The method continues at step 364 where the processing module indicates that the at least the decode threshold number of encoded data slices is invalid.

The method continues at step 366 where the processing module indicates that the at least the decode threshold number of encoded data slices is valid when the comparing of the corresponding integrity check values for each of the at least the decode threshold number of encoded data slices is favorable. Such indicating includes at least one of setting a flag, sending a message, and enabling decoding of the at least the decode threshold number of encoded data slices. The method continues at step 368 where the processing module dispersed storage error decodes the at least the decode threshold number of encoded data slices to reproduce a data segment when the at least the decode threshold number of encoded data slices is valid.

FIG. 16 is another flowchart illustrating another example of storing data, which include similar steps to FIG. 11B. The method begins with step 262 of FIG. 11B where a processing module receives data to store. The method continues with step 372 where the processing module determines storage requirements. The storage requirements may include one or more requirement related to latency, bandwidth, reliability, availability, security, and cost. The determination may be based on one or more of a store command in a request message, a predetermination, a data identifier, a data type, a lookup, and a message.

The method continues at step 374 where the processing module determines candidate dispersed storage (DS) units. The determination may be based on one or more of a data identifier, source name, a slice name, a virtual dispersed storage network (DSN) to physical location table lookup, a list, a query, and a message. The method continues at step 376 where the processing module determines candidate DS unit performance history. The history may include historical data related to one or more of latency, bandwidth, reliability, availability, security, and cost. The determination may be based on one or more of a lookup, a query, a DS unit identifier, and a message.

The method continues with step 378 where the processing module determines a slicing pillar width, a write threshold, and a target threshold. The error coding dispersal storage function parameters include the slicing pillar width and the write threshold. The target threshold is a number greater than or equal to the write threshold and less than or equal to the slicing pillar width. The determination may be based on one or more of the storage requirements, the candidate DS units, the candidate DS unit performance history, a comparison of the candidate DS unit performance history to the storage requirements, a lookup, a query, data storage request message content, and a message. For example, the processing module determines the slicing pillar width=32, the target threshold=15, the write threshold=12, and a threshold=10 when the processing module determines that there are at least 15 candidate DS units with candidate DS unit performance history that compares favorably to the storage requirements.

The method continues at step 380 where the processing module dispersed storage error encodes a portion (e.g., a data segment) of the data to produce a set of encoded data slices. The method continues at step 382 where the processing module selects a target threshold number of DS units of the candidate DS units. The selection may be based on one or more of the storage requirements, the candidate DS units, the candidate DS unit performance history, a comparison of the candidate DS unit performance history to the storage requirements, a lookup, a query, data storage request message content, and a message. For example, the processing module selects the target threshold number of DS units to be DS units with a lowest latency performance history.

The method continues at step 384 where the processing module sends the set of encoded data slices to the selected target threshold number of DS units. The method continues at step 386 where the processing module determines whether a write threshold number of favorable write response messages have been received within a time period. The method branches to step 388 when the processing module determines that the write threshold number of favorable write response messages have been received within the time period. The method continues to step 387 when the processing module determines that the write threshold number of favorable write response messages have not been received within the time period. The method continues at step 387 where the processing module selects a different target threshold number of DS units. The method repeats back to step 384.

The method continues at step 388 where the processing module determines whether a target threshold number of favorable write response messages have been received within a time period when the processing module determines that the write threshold number of favorable write response messages have been received within the time period. The method branches to step 392 when the processing module determines that the target threshold number of favorable write response messages have not been received within the time period. The method ends at step 390 when the processing module determines that the target threshold number of favorable write response messages have been received within the time period.

The method continues at step 392 where the processing module facilitates rebuilding when the processing module determines that the target threshold number of favorable write response messages have not been received within the time period. As such, the data may be retrieved since both the threshold number of DS units have confirmed storage of slices. The rebuilding process may now write slices to all of the DS units for each pillar. The method may provide a system performance improvement (e.g., latency to successfully store the data) by initially sending slices to the target threshold number of DS units rather than to all DS units of the slicing pillar width.

FIG. 17 is another schematic block diagram of another embodiment of a computing system that stores data utilizing a redundant array of independent discs (RAID) method and/or a distributed storage method. The system includes at least one user device 12, at least one RAID memory 400, and at least one dispersed storage network (DSN) memory 22. The DSN memory 22 may include a plurality of dispersed storage (DS) units 36, wherein the DS units may be deployed at one or more sites. The RAID memory 400 may include a plurality of RAID units 402. The RAID units 402 may have an associated memory and/or memory element which may be a single memory device or a plurality of memory devices to store portions of the RAID data. The memory device may be a read-only memory, a read-write memory, random access memory, volatile memory, non-volatile memory, static memory, dynamic memory, flash memory, cache memory, a magnetic disk drive, and/or any device that stores digital information. For example, the RAID memory 400 may include five RAID units 402, wherein each of the five RAID units 402 includes a magnetic disk drive.

The user device 12 may include a computing core 26 and a dispersed storage network interface 32. The computing core 26 includes a DS processing 34 and a RAID controller 404. The RAID controller 404 creates RAID data 406 in accordance with a RAID method based on data provided by the computing core 26, wherein the data provided by the computing core may include one or more of data in a format of data blocks, data objects, and data files in accordance with a file system. The data provided by the computing core 26 may include data that is referenced by one or more of a data object name, a file name, a block number, a data object identifier (ID), and a file ID. The data provided by the computing core 26 may be described in part by metadata where the metadata may include one or more of a data type, a data size, a priority indicator, a security indicator, a performance indicator, a user ID, a group ID, a timestamp, and other descriptors to describe the data. For example, the RAID data 406 includes data and the metadata that describes the data.

In an example of operation, the RAID controller 404 controls the RAID memory 400. The RAID controller 404 produces RAID data 406 that includes commands, memory information, status information, and/or requests. For example, the commands include one or more of write, read, delete, status, erase, and invert. The memory information may include physical addresses utilized within the RAID memory. For example, the RAID controller order for may send the data of a text file, the metadata of the text file, and a store command to the RAID memory 400 to store the data and the metadata in the RAID memory 400. The RAID method may include an approach to produce RAID data based in part on the data to be stored.

The RAID data 406 may include RAID blocks, wherein the RAID blocks include data and/or parity information. The RAID method approach may include dividing the data object into blocks, determining parity information based on the blocks, producing RAID blocks based on the data blocks and the parity information, and determining which RAID blocks to store in which RAID units 402 of the RAID memory 400. For example, the RAID controller 404 may store RAID blocks based of the data object in a first RAID unit 402 and may store RAID blocks based on the parity information in a second RAID unit 402 of the RAID memory 400 in accordance with the RAID method. As another example, the RAID controller 404 may store RAID blocks that include both data object data and parity information in a first RAID unit 402 of the RAID memory 400 in accordance with the RAID method. As yet another example, the RAID controller 404 may store a first RAID block in two or more RAID units 402.

The user device 12 may transform the data to generate RAID data 406 for storage in the RAID memory and/or may dispersed storage error encode the data to produce encoded data slices 11 for storage in the DSN memory 22. For example, the user device 12 transforms the data into RAID data 406 and sends the RAID data 406 to the RAID memory 400 for storage but does not encode the data to produce slices. As another example, the user device 12 dispersed storage error encodes the data to produce encoded data slices 11 and sends the encoded data slices 11 to the DSN memory 22 for storage but does not transform the data to generate RAID data 406. As yet another example, the user device 12 transforms the data into RAID data 406 and sends the RAID data 406 to the RAID memory 400 for storage and user device 12 dispersed storage error encodes the data to produce encoded data slices 11 and sends the encoded data slices 11 to the DSN memory 22 for storage. As such, the user device 12 stores the data in both the RAID memory 400 and the DSN memory 22.

As another example of operation, the DS processing 34 sends RAID data 406 (e.g., including a store and/or retrieve RAID data command) to the RAID memory 400 to store/retrieve RAID data 406 to/from the RAID memory 400. In such an example, the DS processing 34 communicates with substantially the same commands as the RAID controller 404 with the RAID memory 400. In an instance, the DS processing 34 receives RAID data 406 from the RAID memory 400 and transforms the RAID data 406 into data. In another instance, the DS processing 34 transforms data into RAID data 406 and sends the RAID data 406 to the RAID memory 400 for storage.

As yet another example of operation, a processing module of the user device 12 stores the same data as RAID data 406 in the RAID memory 400 and as slices 11 in the DSN memory 22. In a retrieval example of operation, the processing module attempts to retrieve the data by retrieving the RAID data 406 from the RAID memory 400. Next, the processing module retrieves slices 11 from the DSN memory 22 to decode and reproduce the data when the processing module cannot successfully transform the RAID data 406 into the data. As another retrieval example of operation, the processing module attempts to retrieve the data by retrieving slices 11 from the DSN memory 22 and decoding the slices 11 to produce the data. Next, the processing module retrieves the data by retrieving the RAID data 406 from the RAID memory 22 when the processing module cannot successfully decode the slices 11 into the data. As yet another retrieval example of operation, the processing module retrieves slices 11 from the DSN memory 22 and decodes the slices to produce first data and the processing module retrieves the RAID data 406 from the RAID memory 400 and transforms the RAID data 406 into second data. Next, the processing module validates both the first data and the second data when the processing module determines that the first data is substantially the same as the second data. The method of operation of such retrieval examples is discussed in greater detail with reference to FIGS. 18A-19B.

FIG. 18A is another flowchart illustrating another example of storing data, which include similar steps to FIG. 11B. The method begins with step 262 of FIG. 11B where a processing module receives data to store. The method continues at step 410 where the processing module determines available memory, wherein available memory may include a redundant array of independent discs (RAID) memory and a dispersed storage network (DSN) memory. The determination may be based on one or more of a query, a message, a look up, and a command.

The method continues at step 412 where the processing module determines whether RAID memory is available based on the determination of available memory. The method branches to step 418 when the processing module determines that the RAID memory is not available. The method continues to step 414 when the processing module determines that the RAID memory is available. The method continues at step 414 where the processing module transforms the data to create RAID data. The method continues at step 416 where the processing module facilitates storing the RAID data in the RAID memory.

The method continues at step 418 where the processing module determines whether DSN memory is available based on the determination of available memory. The method branches to step 422 when the processing module determines that the DSN memory is available. The method ends at step 420 when the processing module determines that the DSN memory is not available. The method continues at step 422 where the processing module dispersed storage error encodes the data to produce a plurality of sets of encoded data slices. The method continues at step 424 where the processing module sends the plurality of sets of encoded data slices to the DSN memory for storage therein.

FIG. 18B is a flowchart illustrating an example of retrieving data. The method begins with step 426 where a processing module (e.g., a dispersed storage (DS) processing unit) receives a data retrieval request message. The data retrieval request message may include one or more of a data identifier, a source name, one or more slice names, a virtual dispersed storage network (DSN) address, a memory identifier, a priority indicator, a security indicator, a performance indicator, a user identifier (ID), and a retrieval request command. The method continues at step 428 where the processing module facilitates retrieving the data from a redundant array of independent disks (RAID) memory based on information received in the data retrieval request message.

The method continues at step 430 where the processing module determines whether the data is successfully retrieved from the RAID memory. The determination may be based on one or more of the data, a stored data size indicator, a measured data size, calculating a calculated integrity check value, receiving a stored integrity check value, and comparing the calculated integrity check value to the stored integrity check value. For example, the processing module determines that the data is successfully retrieved when the stored integrity check value compares favorably to the calculated integrity check value. The method branches to step 434 when the processing module determines that the data is not successfully retrieved from the RAID memory. The method ends at step 432 when the processing module determines that the data is successfully retrieved from the RAID memory.

The method continues at step 434 where the processing module retrieves the threshold number of encoded data slices corresponding to each of a plurality of sets of encoded data slices corresponding to the data from a DSN memory. The method continues at step 436 where the processing module dispersed storage error decodes the threshold number of encoded data slices corresponding to each of the plurality of sets of encoded data slices to reproduce the data.

FIG. 18C is another flowchart illustrating another example of retrieving data, which include similar steps to FIG. 18B. The method begins with step 426 of FIG. 18B where a processing module receives a data retrieval request. The method continues at step 440 where the processing module retrieves a threshold number of encoded data slices corresponding to each of a plurality of sets of encoded data slices corresponding to the data from a dispersed storage network (DSN) memory. The threshold number of slices may not be received due to one or more of errors, a network failure, a dispersed storage (DS) unit failure, and any other error preventing the retrieval of the slices.

The method continues at step 442 where the processing module dispersed storage error decodes the threshold number of encoded data slices corresponding to each of the plurality of sets of encoded data slices to reproduce the data. The method continues at step 444 where the processing module determines whether the data is successfully retrieved from the DSN memory. The determination may be based on one or more of the data, validated encoded data slices, a stored data size indicator, a measured data size, calculating a calculated integrity check value, receiving a stored integrity check value, and comparing the calculated integrity check value to the stored integrity check value. For example, the processing module determines that the data is successfully retrieved when the stored integrity check value compares favorably to the calculated integrity check value. The method branches to step 448 when the processing module determines that the data is not successfully retrieved from the DSN memory. The method ends at step 446 when the processing module determines that the data is successfully retrieved from the DSN memory. The method continues at step 448 where the processing module facilitates retrieving the data from a RAID memory.

FIG. 19A is another flowchart illustrating another example of retrieving data, which include similar steps to FIG. 18B. The method begins with step 426 of FIG. 18B where a processing module receives a data retrieval request. The method continues with step 450 where the processing module sends redundant array of independent disks (RAID) data to a RAID memory to facilitate retrieving the data. The method continues at step 452 where the processing module sends at least a threshold number of retrieve slice request messages to at least a threshold number of dispersed storage (DS) units of a dispersed storage network (DSN) memory wherein at least some of the plurality of sets of encoded data slices corresponding to the data are stored.

The method continues with step 454 where the processing module determines sourcing of the data by determining whether the data is received from the RAID memory or whether data is received as a threshold number of encoded data slices from the DSN memory corresponding to each of the plurality of sets of encoded data slices facilitating decoding the threshold number of encoded data slices to produce the data. For example, the data is received from the RAID memory first. As another example, the data is received from the DSN memory first. The method branches to step 456 where the processing module utilizes the data from the DSN memory when the processing module determines that a first received source is the DSN memory. The method continues to step 458 when the processing module determines that the first received source is the RAID memory. The method continues at step 458 where the processing module utilizes the data from the RAID memory as the data. The method continues at step 456 where the processing module utilizes the data from the DSN memory as the data when the processing module determines that the first received source is the DSN memory.

FIG. 19B is another flowchart illustrating another example of retrieving data that includes similar steps to FIGS. 18B and 18C. The method begins with step 426 of FIG. 18B where a processing module receives a data retrieval request. The method continues at step 460 where the processing module facilitates retrieving the data from a redundant array of independent disks (RAID) data memory to produce first data. The method continues at step 440 of FIG. 18C where the processing module retrieves a threshold number of encoded data slices corresponding to each of a plurality of sets of encoded data slices corresponding to the data from a dispersed storage network (DSN) memory. The method continues at step 462 where the processing module dispersed storage error decodes the threshold number of encoded data slices corresponding to each of the plurality of sets of encoded data slices to produce second data.

The method continues at step 464 where the processing module determines whether the first data and the second data are substantially the same. The method branches to step 468 when the processing module determines that the first data and the second data are substantially the same. The method continues to step 466 when the processing module determines that the first data and the second data are not substantially the same. The method continues at step 466 where the processing module sends an error message. The error message may include one or more of an indication that the first data and the second data are not substantially the same, a RAID memory identifier, a DSN memory identifier, a data identifier, the user identifier, one or more slice names, a source name, and an error code. The processing module may send the error message to one or more of a dispersed storage (DS) managing unit, a DS unit, a DS processing unit, a user device, a requester, and a storage integrity processing unit. The method continues at step 468 where the processing module utilizes the first data as the data when the processing module determines that the first and second data are substantially the same. Alternatively, the processing module utilizes the second data as the data when the processing module determines that the first and second data are substantially the same.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:
retrieving at least a threshold number of error coded data slices of a set of error coded data slices from storage units of the DSN, wherein a dispersed storage error encoding function has been altered to include an intentional error pattern to produce an altered dispersed storage error encoding function, wherein a data segment was encoded using the altered dispersed storage error encoding function to produce the set of error coded data slices, and wherein, as a result of the intentional error pattern, one or more error coded data slices of the set of error coded data slices is intentionally altered to include an error;
identifying, based on the intentional error pattern, error coded data slices of the at least a threshold number of error coded data slices that were intentionally altered to include the error to produce identified error coded data slices;
modifying the identified error coded data slices to extract the intentionally included error to produce adjusted error coded data slices;
decoding the adjusted error coded data slices and remaining ones of the at least a threshold number of error coded data slices using the dispersed storage error encoding function to produce a recovered data segment;
encoding the recovered data segment using the altered dispersed storage error encoding function to produce a test set of error coded data slices;
comparing the error coded data slices of the test set of error coded data slices with the error coded data slices of the at least a threshold number of error coded data slices; and
when, on a corresponding slice by slice basis, the error coded data slices of the test set of error coded data slices substantially match the error coded data slices of the at least a threshold number of error coded data slices, indicating that the recovered data segment has not been corrupted.

2. The method of claim 1 further comprises:
altering the dispersed storage error encoding function by:
converting the data segment into a data matrix;
generating a coded matrix from the data matrix and an encoding matrix, wherein the coded matrix includes encoded blocks;
inserting intentional error blocks into the coded matrix in accordance with the intentional error pattern; and
arranging the encoded blocks and the intentional error blocks into the set of error coded data slices.

3. The method of claim 2, wherein the modifying the identified error coded data slices comprises:
arranging the at least a threshold number of error coded data slices into a recovered coded matrix of the encoded blocks and the intentional error blocks; and
removing the intentional error blocks from the recovered coded matrix to produce the adjusted error coded data slices and the remaining ones of the at least a threshold number of error coded data slices.

4. The method of claim 1 further comprises:
altering the dispersed storage error encoding function by:
converting the data segment into a data matrix;
generating a coded matrix from the data matrix and an encoding matrix, wherein the coded matrix includes encoded blocks;
generating an intentional error data matrix in accordance with the intentional error pattern;
generating an intentional error coded matrix from the intentional error data matrix and the encoding matrix, wherein the intentional error coded matrix includes intentional error blocks; and
arranging the encoded blocks and the intentional error blocks into the set of error coded data slices.

5. The method of claim 4, wherein the modifying the identified error coded data slices comprises:
arranging the at least a threshold number of error coded data slices into a recovered coded matrix of the encoded blocks and the intentional error blocks; and
removing the intentional error blocks from the recovered coded matrix to produce the adjusted error coded data slices and the remaining ones of the at least a threshold number of error coded data slices.

6. The method of claim 1 further comprises:
altering the dispersed storage error encoding function to include the intentional error pattern to produce the altered dispersed storage error encoding function;
encoding the data segment using the altered dispersed storage error encoding function to produce the set of error coded data slices; and
transmitting the set of error coded data slices to the storage units of the DSN or to another device of the DSN.

7. The method of claim 1 further comprises:
repeating the retrieving, the identifying, the modifying, the decoding, the encoding, the comparing, and the indicating for another data segment, wherein the data segment and the other data segment are portions of a data object.

8. The method of claim 1 further comprises:
retrieving at least another threshold number of error coded data slices of another set of error coded data slices from the storage units, wherein the dispersed storage error encoding function has been altered to include a second intentional error pattern to produce a second altered dispersed storage error encoding function, wherein another data segment was encoded using the second altered dispersed storage error encoding function to produce the other set of error coded data slices, wherein, as a result of the second intentional error pattern, one or more error coded data slices of the other set of error coded data slices is intentionally altered to include an error, wherein the data segment and the other data segment are portions of a data object;
identifying, based on the second intentional error pattern, the error coded data slices of the at least a threshold number of error coded data slices that were intentionally altered to include the error to produce second identified error coded data slices;
modifying the second identified error coded data slices to extract the intentionally included error to produce second adjusted error coded data slices;
decoding the second adjusted error coded data slices and remaining ones of the at least a threshold number of error coded data slices using the dispersed storage error encoding function to produce a second recovered data segment;
encoding the second recovered data segment using the second altered dispersed storage error encoding function to produce a second test set of error coded data slices;

comparing the error coded data slices of the second test set of error coded data slices with the error coded data slices of the at least another threshold number of error coded data slices; and when, on a corresponding slice by slice basis, the error coded data slices of the second test set of error coded data slices substantially match the corresponding error coded data slices of the at least another threshold number of error coded data slices, indicating that the second recovered data segment has not been corrupted.

9. A dispersed storage network (DSN) comprises:
a first module, when operable within a device of the DSN, causes the device to:
retrieve at least a threshold number of error coded data slices of a set of error coded data slices from storage units of the DSN, wherein a dispersed storage error encoding function has been altered to include an intentional error pattern to produce an altered dispersed storage error encoding function, wherein a data segment was encoded using the altered dispersed storage error encoding function to produce the set of error coded data slices, and wherein, as a result of the intentional error pattern, one or more error coded data slices of the set of error coded data slices is intentionally altered to include an error;
identify, based on the intentional error pattern, error coded data slices of the at least a threshold number of error coded data slices that were intentionally altered to include the error to produce identified error coded data slices;
modify the identified error coded data slices to extract the intentionally included error to produce adjusted error coded data slices; and
decode the adjusted error coded data slices and remaining ones of the at least a threshold number of error coded data slices using the dispersed storage error encoding function to produce a recovered data segment;
a second module, when operable within the device, causes the device to:
encode the recovered data segment using the altered dispersed storage error encoding function to produce a test set of error coded data slices; and
a third module, when operable within the device, causes the device to:
compare the error coded data slices of the test set of error coded data slices with the error coded data slices of the at least a threshold number of error coded data slices; and
when, on a corresponding slice by slice basis, the error coded data slices of the test set of error coded data slices substantially match the corresponding error coded data slices of the at least a threshold number of error coded data slices, indicate that the recovered data segment has not been corrupted.

10. The DSN of claim 9 further comprises:
the first module, when operable within the device, further causes the device to:
alter the dispersed storage error encoding function by:
converting the data segment into a data matrix;
generating a coded matrix from the data matrix and an encoding matrix, wherein the coded matrix includes encoded blocks;
inserting intentional error blocks into the coded matrix in accordance with the intentional error pattern; and
arranging the encoded blocks and the intentional error blocks into the set of error coded data slices.

11. The DSN of claim 10, wherein the first module functions to modify the identified error coded data slices by:
arranging the at least a threshold number of error coded data slices into a recovered coded matrix of the encoded blocks and the intentional error blocks; and
removing the intentional error blocks from the recovered coded matrix to produce the adjusted error coded data slices and the remaining ones of the at least a threshold number of error coded data slices.

12. The DSN of claim 9 further comprises:
the first module, when operable within the device, further causes the device to:
alter the dispersed storage error encoding function by:
converting the data segment into a data matrix;
generating a coded matrix from the data matrix and an encoding matrix, wherein the coded matrix includes encoded blocks;
generating an intentional error data matrix in accordance with the intentional error pattern;
generating an intentional error coded matrix from the intentional error data matrix and the encoding matrix, wherein the intentional error coded matrix includes intentional error blocks; and
arranging the encoded blocks and the intentional error blocks into the set of error coded data slices.

13. The DSN of claim 12, wherein the first module functions to modify the identified error coded data slices by:
arranging the at least a threshold number of error coded data slices into a recovered coded matrix of the encoded blocks and the intentional error blocks; and
removing the intentional error blocks from the recovered coded matrix to produce the adjusted error coded data slices and the remaining ones of the at least a threshold number of error coded data slices.

14. The DSN of claim 9 further comprises:
the first module, when operable within the device, further causes the device to:
alter the dispersed storage error encoding function to include the intentional error pattern to produce the altered dispersed storage error encoding function;
encode the data segment using the altered dispersed storage error encoding function to produce the set of error coded data slices; and
transmit the set of error coded data slices to the storage units of the DSN or to another device of the DSN.

15. The DSN of claim 9 further comprises:
the first module, when operable within the device, further causes the device to:
repeat the retrieve, the identify, the modify, and the decode for another data segment,
wherein the data segment and the other data segment are portions of a data object;
the second module, when operable within the device, further causes the device to:
repeat the encode for the other data segment; and
the third module, when operable within the device, further causes the device to:
repeat the compare and the indicate for the other data segment.

16. The DSN of claim 9 further comprises:
the first module, when operable within the device, further causes the device to:
retrieve at least another threshold number of error coded data slices of another set of error coded data slices from the storage units, wherein the dispersed storage error encoding function has been altered to include a second intentional error pattern to produce a second altered dispersed storage error encoding function, wherein another data segment was encoded using the second altered dispersed storage error encoding function to produce the other set of error coded data slices, wherein, as a result of the second intentional error pattern, one or more error coded data slices of the other set of error coded data slices is intentionally altered to include an error, wherein the data segment and the other data segment are portions of a data object;

identify, based on the second intentional error pattern, the error coded data slices of the at least a threshold number of error coded data slices that were intentionally altered to include the error to produce second identified error coded data slices;

modify the second identified error coded data slices to extract the intentionally included error to produce second adjusted error coded data slices; and decode the second adjusted error coded data slices and remaining ones of the at least a threshold number of error coded data slices using the dispersed storage error encoding function to produce a second recovered data segment;

the second module, when operable within the device, further causes the device to:
  encode the second recovered data segment using the second altered dispersed storage error encoding function to produce a second test set of error coded data slices; and the third module, when operable within the device, further causes the device to:
  compare the error coded data slices of the second test set of error coded data slices with the error coded data slices of the at least another threshold number of error coded data slices; and when, on a corresponding slice by slice basis, the error coded data slices of the second test set of error coded data slices substantially match the error coded data slices of the at least another threshold number of error coded data slices, indicate that the second recovered data segment has not been corrupted.

* * * * *